United States Patent [19]
Brandt et al.

US005755550A
[11] Patent Number: 5,755,550
[45] Date of Patent: May 26, 1998

[54] VACUUM DEPALLETIZER APPARATUS AND METHOD

[75] Inventors: Roy Frank Brandt, St. Cloud; Donald W. Olson, Mora, both of Minn.

[73] Assignee: Fingerhut Corporation, Minnetonka, Minn.

[21] Appl. No.: 531,584

[22] Filed: Sep. 21, 1995

[51] Int. Cl.$^6$ ................................................. B66C 1/02
[52] U.S. Cl. ..................... 414/797; 414/744.3; 294/64.1; 901/40
[58] Field of Search ............................ 294/64.1; 901/40; 414/797, 744.3

[56] References Cited

U.S. PATENT DOCUMENTS

| | | | |
|---|---|---|---|
| 4,674,785 | 6/1987 | Riesenberg | 294/64.1 |
| 4,858,976 | 8/1989 | Stoll | 294/64.1 |
| 5,035,568 | 7/1991 | Joulin | 294/64.1 |
| 5,149,162 | 9/1992 | Focke et al. | 294/64.1 |
| 5,207,467 | 5/1993 | Smith | 294/64.1 |
| 5,308,132 | 5/1994 | Kirby et al. | 294/64.1 |
| 5,475,619 | 12/1995 | Sugano et al. | 901/40 |

OTHER PUBLICATIONS

ABB Flexible Automation Inc. brochure entitled "Industrial Robots," 6 pages dated May 1995.
ABB Flexible Automation Inc. brochure entitled "FlexPalletizer™ Standard Flexible Palletizing Solutions," 2 pages, dated 1995.
ABB Flexible Automation Inc. brochure entitled "Flexible Systems for Packaging and Palletizing,," 1 page, dated 1994.
ABB Flexible Automation Inc. brochure entitled "Palletize Complex Mixed Loads With One Standard?," 1 page, undated.
Vi–Cas Mfg. catalog entitled "Accessories for: Material Handling Package Machinery Printing Equipment," 12 pages, undated.
Banner Engineering Corp. brochure entitled "T18 Series Polarized Retroreflective Sensors", two pages, undated.
Banner Engineering Corp. brochure entitled "T18 Series Opposed Mode Sensor Pairs", two pages, undated.

*Primary Examiner*—Karen B. Merritt
*Assistant Examiner*—Gregory A. Morse
*Attorney, Agent, or Firm*—Merchant, Gould, Smith, Edell, Welter & Schmidt P.A.

[57] ABSTRACT

A vacuum apparatus and method are provided for controlling operation of a vacuum force to be applied through a vacuum cup for use in lifting objects such as cardboard boxes, so as to unload a pallet holding one or more of the boxes. The apparatus includes a valve body defining an inner chamber, a lift vacuum passage extending through the valve body to the chamber, a pilot vacuum passage extending through the valve body to the chamber, and a vacuum cup passage extending through the valve body to the chamber. A vacuum cup is connected to the valve body in airflow communication with the vacuum cup passage. A piston is disposed in the chamber and positioned for reciprocal movement between a first position and a second position. In the first position, the piston provides an airflow passageway between the pilot vacuum passage and the vacuum cup passage such that, if the vacuum cup is obstructed, the piston is pulled down by the pilot vacuum force to a second position. In the second position, the piston provides an airflow passageway between the lift vacuum passage and the vacuum cup passage in order to apply a lift vacuum force to an object obstructing the corresponding vacuum cup.

26 Claims, 21 Drawing Sheets

VACUUM DEPALLETIZER APPARATUS AND METHOD

FIELD OF THE INVENTION

The present invention relates to an apparatus and method for controlling operation of a vacuum force through a vacuum cup, and also relates to an apparatus and method for lifting objects using a vacuum force.

BACKGROUND OF THE INVENTION

Removing boxes stacked on a pallet typically involves a labor intensive process. Usually, workers manually lift the boxes and move them onto, for example, a conveyor belt. A distribution center, for example, therefore relies upon workers to manually move boxes containing merchandise from a pallet onto a conveyor belt where the boxes are unpackaged by additional workers.

The manual removal of boxes from a pallet or "depalletizing" often results in back problems for the workers and other similar injuries due to the labor intensive nature of the work. In addition, since the workers often have incentives to remove boxes from the pallets more quickly, they may increase their speed of work, which only compounds the problems and increases the likelihood of injury.

One system for automatically lifting a box to remove it from a pallet involves the use of a vacuum force through a plurality of vacuum cups. In order for the device to detect whether or not each vacuum cup is obstructed, the device includes a pin in the center of the vacuum cup. If the pin is depressed by contact with an object, the vacuum force through the vacuum cup is activated.

This system, however, may result in vacuum cups activated which are only partially obstructed. For instance, if an object is covering slightly more than half of the vacuum cup including the center point, then the pin will be depressed and the vacuum cup activated, even though the entire cup is not obstructed. This results in inefficient use of the vacuum force.

The problems involved in automatic depalletizing are compounded when the objects on the pallet vary with respect to size and stacking patterns in each pallet and from pallet to pallet.

Accordingly, a needs exists for an improved apparatus and method for controlling operation of a vacuum force through a vacuum cup.

SUMMARY OF THE INVENTION

This invention is an apparatus and method for controlling operation of a vacuum force to be applied through a vacuum cup. The apparatus includes a valve body defining an inner chamber, a lift vacuum passage extending through the valve body to the chamber, a pilot vacuum passage extending through the valve body to the chamber, and a vacuum cup passage extending through the valve body to the chamber. A vacuum cup is connected to the valve body in airflow communication with the vacuum cup passage. A piston is disposed in the chamber and positioned for reciprocal movement between a first position and a second position, wherein the piston in the first position provides an airflow passageway between the pilot vacuum passage and the vacuum cup passage, and the piston in the second position provides an airflow passageway between the lift vacuum passage and the vacuum cup passage.

The method is used for detecting whether an object obstructs a vacuum cup and for applying a vacuum force through the vacuum cup if obstructed. A first vacuum force is applied through a valve body having a piston in a first position. The piston is moved to a second position if a vacuum cup connected to the valve body is obstructed. A second vacuum force is applied through the vacuum cup with the piston in the second position.

DETAILED DESCRIPTION

The present invention is an apparatus and method for controlling operation of a vacuum force through a vacuum cup. The apparatus and method involve turning off and on a valve using a slidable piston in order to activate and deactivate a vacuum force through a vacuum cup. This allows the detection, for example, of when a vacuum cup is essentially completely covered or obstructed by an object. The object may be slightly porous and allow for some air loss; for example, a cardboard box. However, the apparatus and method can detect when the object is covering the entire vacuum cup in order to activate a lifting force. In a system with a plurality of vacuum cups, the system only activates those cups where a vacuum can be used during the lifting operation, thereby saving vacuum that would otherwise be applied to the vacuum cups that are not involved in the lifting operation. Using a plurality of the vacuum cups allows for convenient lifting of irregularly shaped loads, and a variety of stacking patterns.

Figure 1A:
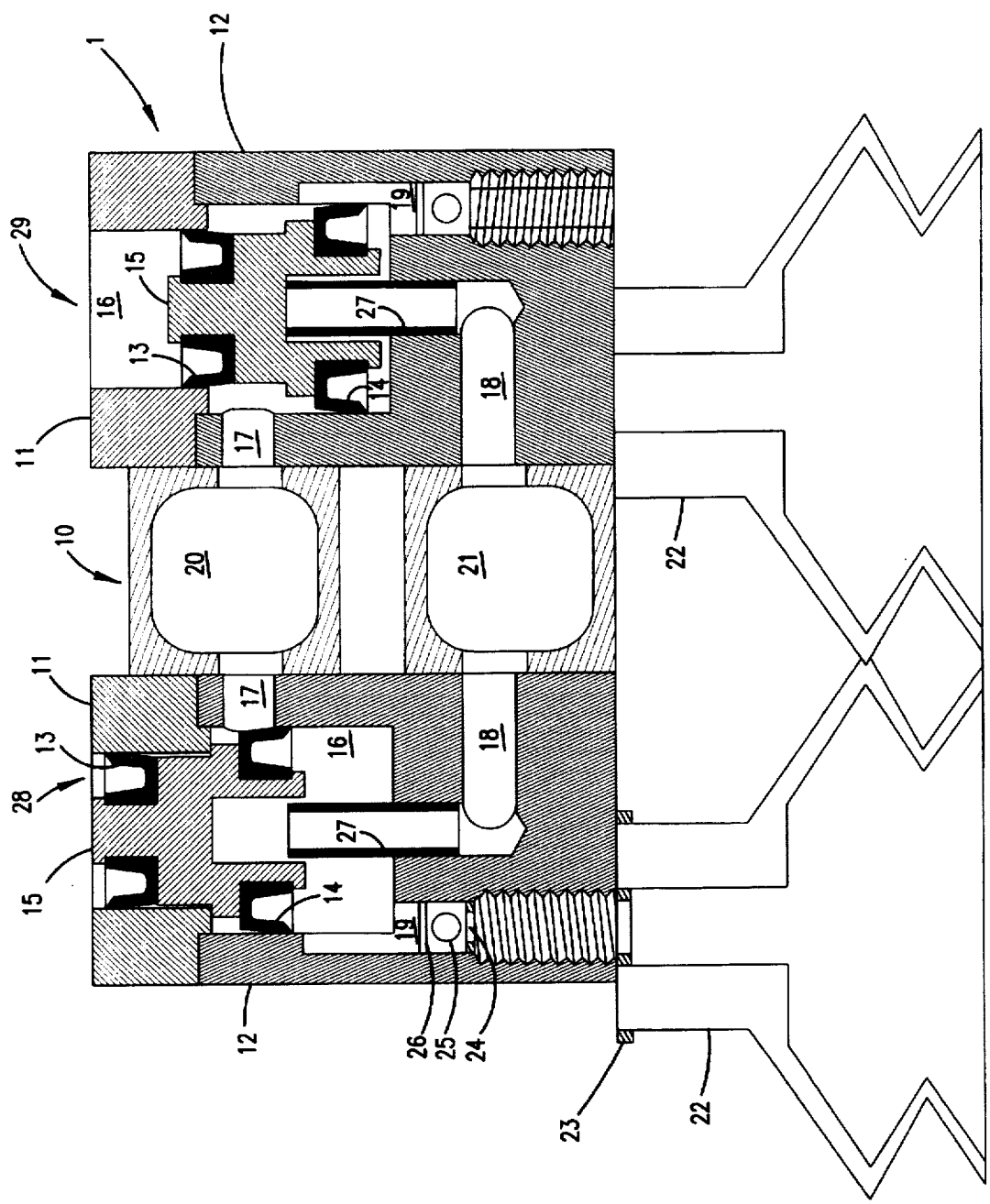
FIG. 1A is a cross-sectional side view of an apparatus for controlling the vacuum force through a vacuum cup.

FIG. 1A is a cross-sectional side view of an apparatus 1 for activating and deactivating vacuum cups using slidable pistons. The apparatus includes a valve body 12. The valve body 12 defines an inner chamber 12, a lift vacuum passage 17, a pilot vacuum passage 18, and a vacuum cup passage 19. The vacuum cup passage 19 has been moved in the figures for illustrative purposes only; it is preferably approximately centered within the valve body 12 and located behind restrictor tube 27.

Disposed within the inner chamber 16 is a moveable piston 15. The piston 15 typically includes a first seal 13 and second seal 14 for blocking passage of air between piston 15 and the walls of inner chamber 16. On top of valve body 12 is situated a cap 11. Valve body 12 and cap 11 may be implemented with a single block of material. However, for ease of manufacturing, a valve body 12 is typically manufactured and a cap 11 then placed upon valve body 12.

The lift vacuum passage 17 is in airway communication with a manifold 10 which includes a source of lift vacuum pressure 20. The pilot vacuum passage 18 is also in airflow communication with a manifold 10 and a source of pilot vacuum pressure 21. Typical pressures supplied via the manifold 10 are, for example, about 17 to 24 inches of mercury for lift vacuum pressure, and about 15 to 20 inches of mercury for pilot vacuum pressure. Items 20 and 21 may be physically coupled together in one block of material or may comprise separate items.

The pilot vacuum passage 18 is also in airflows communication with the restrictor tube 27. The vacuum cup passage 19 typically includes a cylinder 24 which screws into the valve body 12. A vacuum cup 22 is attached to cylinder 24 using a clamp 23. The vacuum cup 22 typically has accordion-shaped sides in order to form a better seal around objects which have a slightly non-planar top surface or slanted top surface. The vacuum cup passage 19 typically also includes a check valve formed by items 24, 25, and 26. A positive pressure in passage 19 pushes ball 25 against the top of cylinder 24, creating an air seal. A negative pressure in passage 19 forces ball 25 against rod 26, allowing for air flow through vacuum passage 19.

While FIG. 1A illustrates a first vacuum cup apparatus 28 and a second vacuum cup apparatus 29 on opposite sides of manifold 10, alternatively a single vacuum cup apparatus or multiple vacuum cup apparatuses may be controlled by manifold 10 according to the principals of the present invention.

Figure 1B:
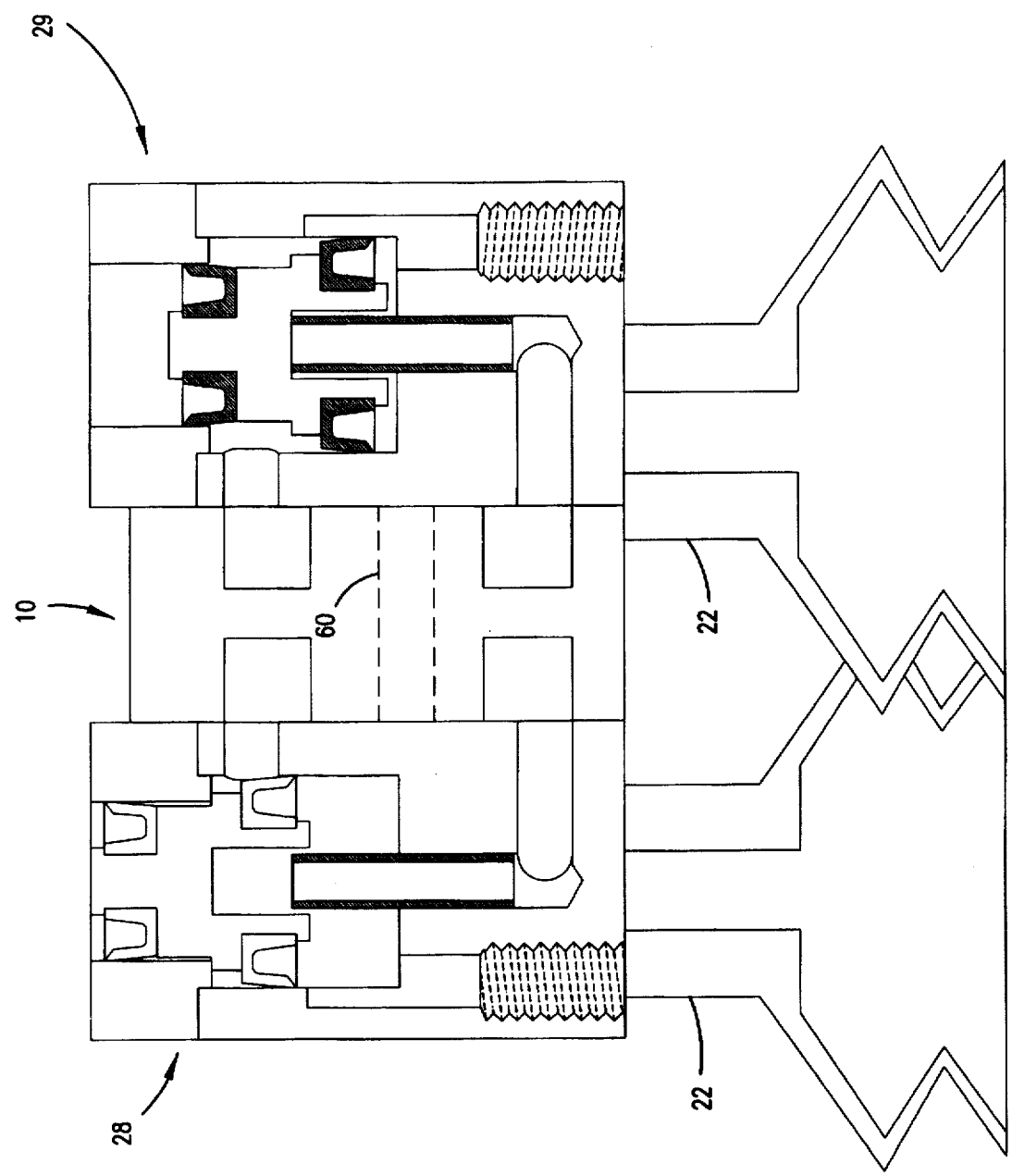
FIG. 1B is a cross-sectional side view of an alternate embodiment of the apparatus shown in FIG. 1A.

FIG. 1B is a side cross-sectional view of an alternate embodiment of the apparatus shown in FIG. 1A.

This alternate embodiment includes the manifold 10 as one unit with a centered bolt hole 60 for connecting the first vacuum cup apparatus 28 and the second vacuum cup apparatus 29.

The following explains operation of the apparatus 1 of FIG. 1A. The apparatus 1 typically includes two modes of operation. A first mode is used to detect whether or not a vacuum cup is obstructed. A second mode is then used in order to activate a lifting vacuum force through the vacuum cup, if obstructed.

Side 28 of the apparatus 1 illustrates operation in the first mode. In the first mode, a vacuum force is activated through the pilot vacuum passage 18. A reduced vacuum, such as 25% of the lift vacuum, in the example case, 4.25 to 6.0 inches of mercury, is applied through vacuum passage 17. This holds the piston initially in the upper position before the lift vacuum is applied. If the vacuum cup 22 is obstructed, an air seal is created which substantially blocks passage of airflow through the vacuum cup 22. This results in the piston 15 being pulled downward against the top of restrictor tube 27. If, on the other hand, the vacuum cup 22 is not obstructed, then air is simply drawn through the vacuum cup 22, vacuum cup passage 19 and the restrictor tube 27. The pilot vacuum is only applied for a short amount of time, e.g., 0.25 seconds. The reduced vacuum is optional. Friction may be sufficient to hold those pistons in the upper position that are not associated with vacuum cups that are obstructed. The second mode is then used in order to apply a lifting vacuum force through vacuum cup 22. Side 29 of the apparatus 1 illustrates operation in the second mode. Assuming that vacuum cup 22 is obstructed, piston 15 is shown in the downward position against restrictor tube 27, as explained above with respect to the first mode. In the second mode, a lifting vacuum force is applied through lift vacuum passage 17. If the piston is in the down position indicating an obstructed vacuum cup, then the lifting vacuum force is applied around piston 15 through chamber 16 and through vacuum cup passage 22. This situation is illustrated on side 29.

If, on the other hand, the vacuum cup was not obstructed and the piston 15 remained in the "up" position, then airflow through lift vacuum passage will be obstructed by the piston 15 and seals 13 and 14, as illustrated on side 28. Accordingly, the lifting vacuum force is preferably only applied through the vacuum cups which are obstructed. In addition, since the top circumference of piston 15 is smaller than the bottom circumference, it remains in the "up" position during operation of the lifting vacuum force. This similarly maintains the piston 15 in the up position while the reduced vacuum is applied through vacuum passage 17. The pilot vacuum overcomes the reduced vacuum force for those vacuum cups that are obstructed.

Subsequent to the second mode in which the lifting vacuum force is applied, the apparatus is typically reset by applying a positive pressure through pilot vacuum passage 18 in order to "push" piston 15 to the "up" position. A typical pressure for resetting the apparatus 1 is, for example, 90 to 100 psi. The check valve formed by items 24, 25, and 26 seals off the vacuum cup passage 19 in order to assist in the resetting of the apparatus. Alternatively, the apparatus may be reset by using a vacuum force in order to pull the piston up from the valve cap.

The items in the apparatus shown in FIGS. 1A and 1B are preferably implemented with the following materials: aluminum for the valve cap 11; delrin for the piston 15; aluminum for the valve body 12; soft plastic for the manifold 10; and steel for the restrictor tube 27. The vacuum cup 22 is preferably implemented with a conventional vacuum cup such as those manufactured by VI-CAS Mfg. of Cincinnati, Ohio.

Figure 2:
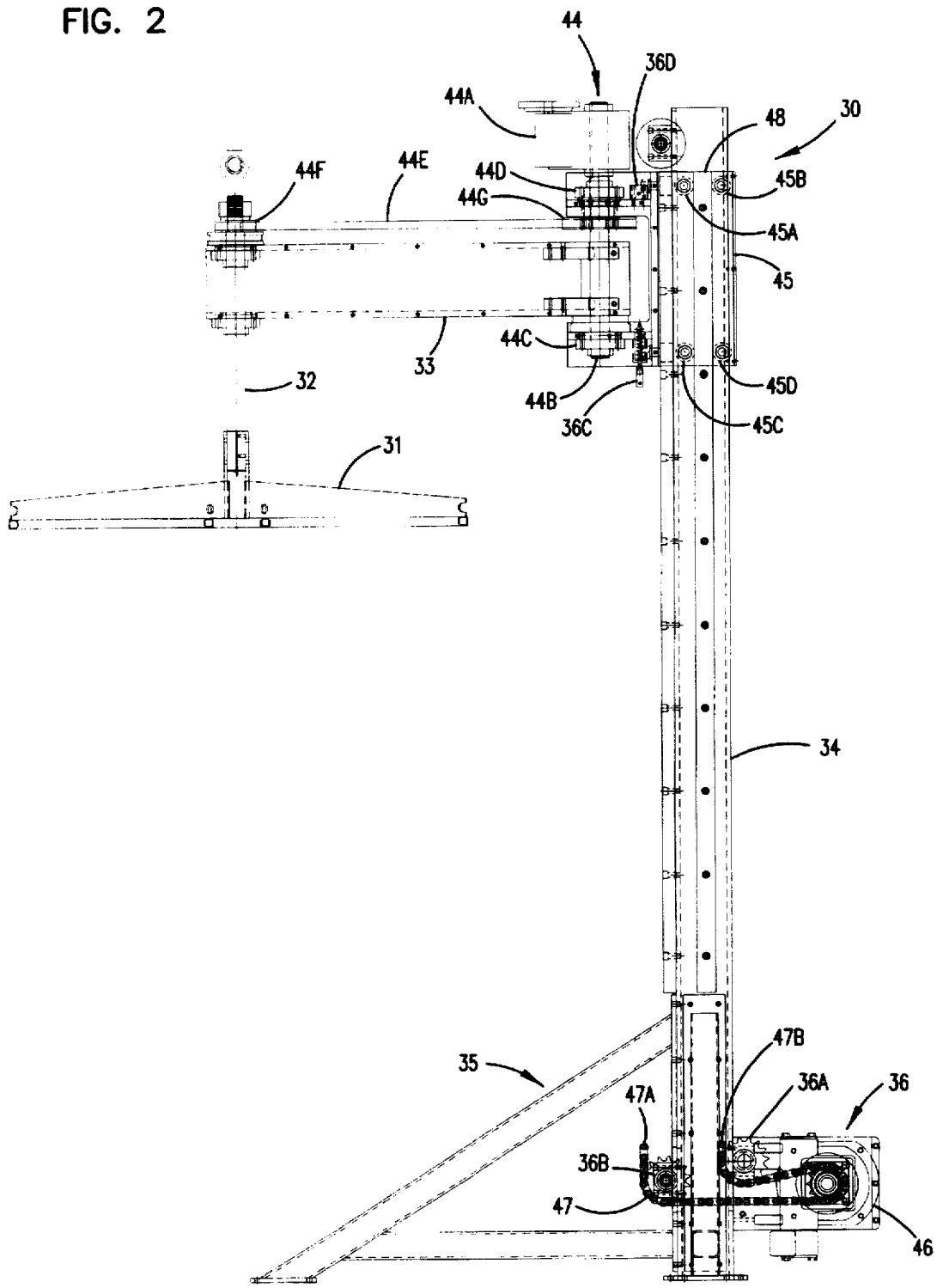
FIG. 2 is a side view of a device which includes the apparatus of FIG. 1 and is used for lifting and moving objects.
Figure 3:
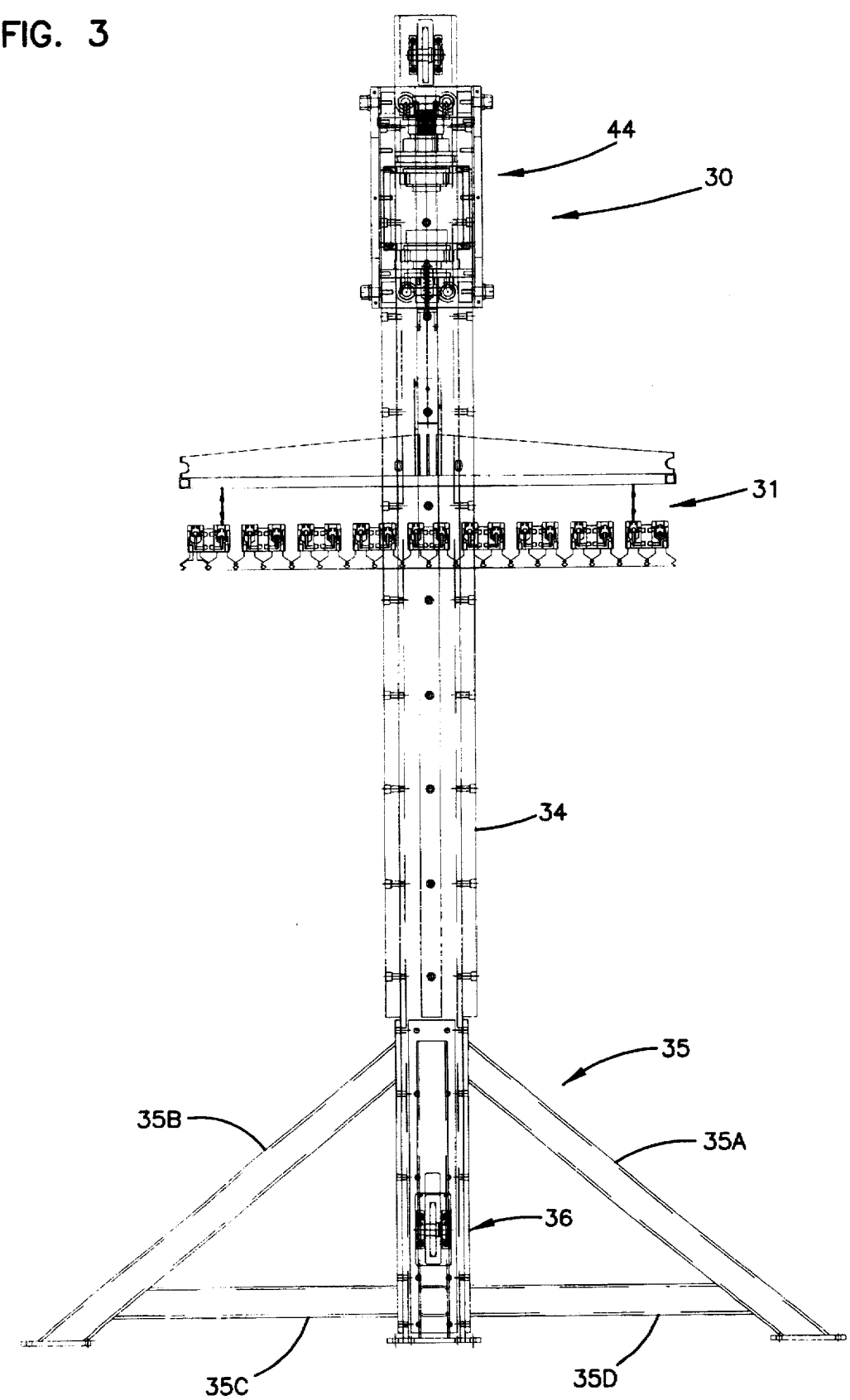
FIG. 3 is a front view of the device of FIG. 2.

FIG. 2 is a side view of an example device 30 which uses the apparatus 1 of FIG. 1A in order to lift and move objects. A plurality of the apparatus of FIG. 1A are typically attached to a frame 31 in a grid pattern, such as by brackets, and these apparatus are also connected via vacuum hoses to one or more sources of vacuum pressure for supplying the lift, pilot, and reduced vacuums. These apparatus are also connected to the source of reset pressure. Further features of the device 30 are shown in FIGS. 3–8. Other constructions for the device 30 are possible to accomplish lifting, and horizontal movement, if desired, of any objects held by the apparatus 1 under the lift vacuum.

Figure 6:
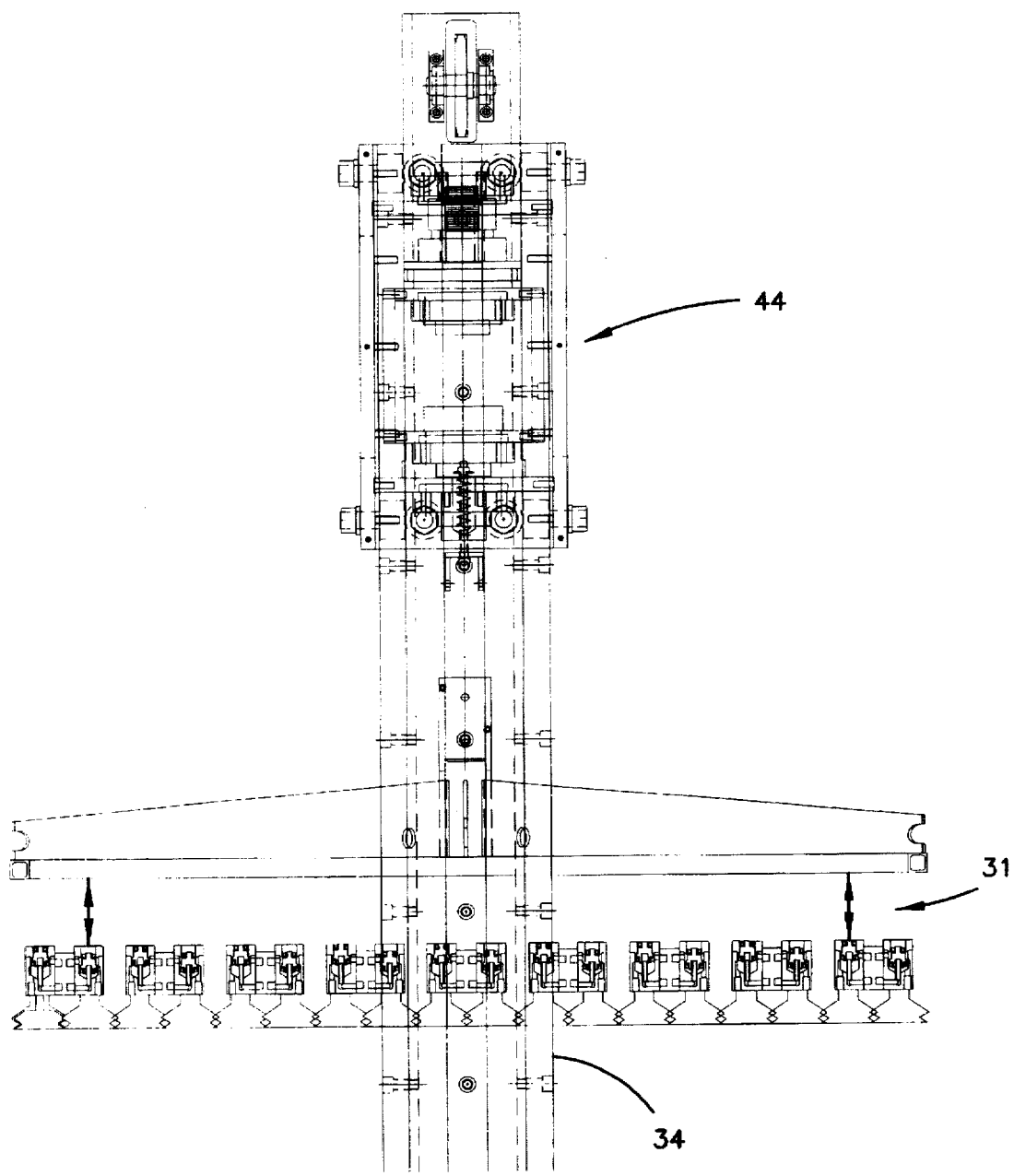
FIG. 6 is an enlarged front view of the top portion of the device of FIG. 2.
Figure 7:
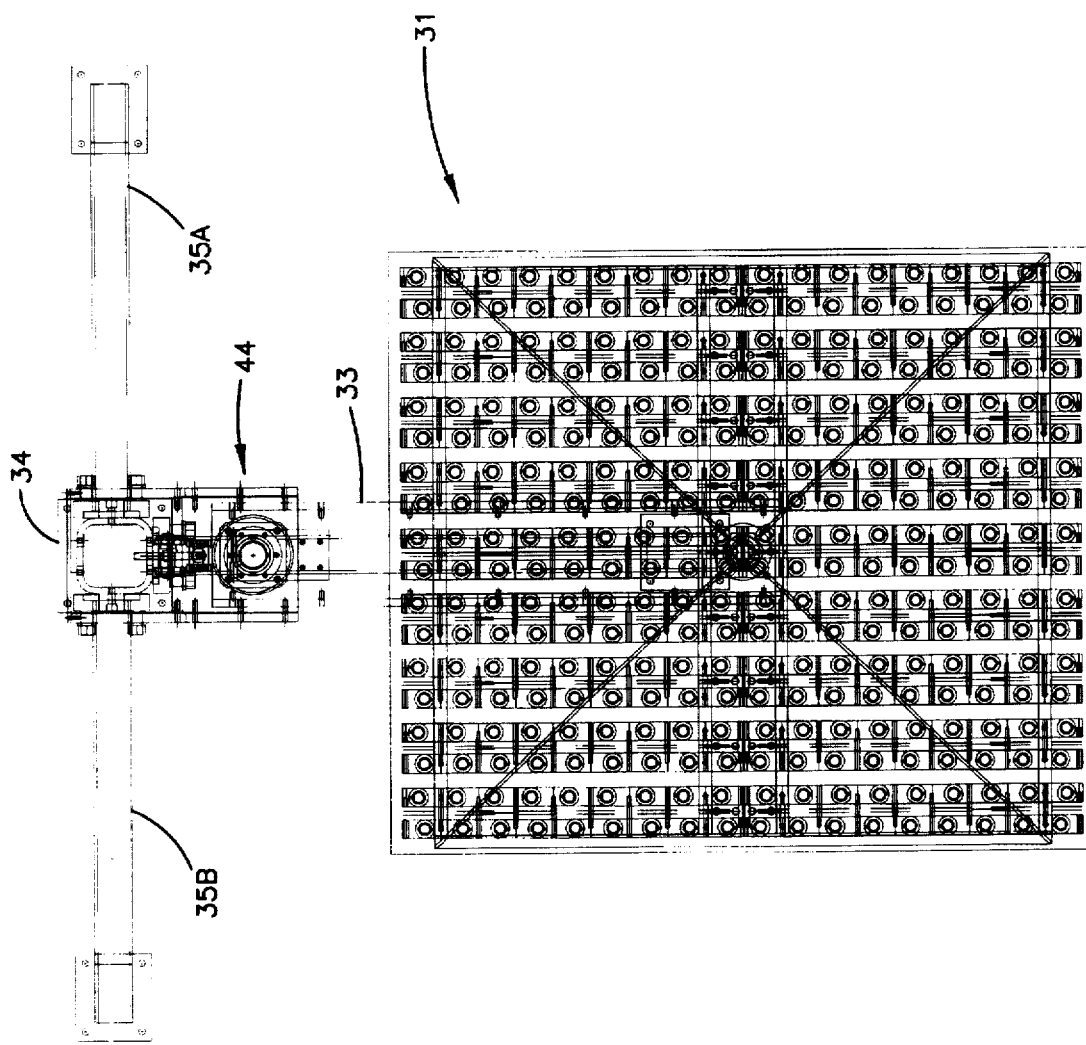
FIG. 7 is a top view of a portion of the device of FIG. 2.
Figure 8:
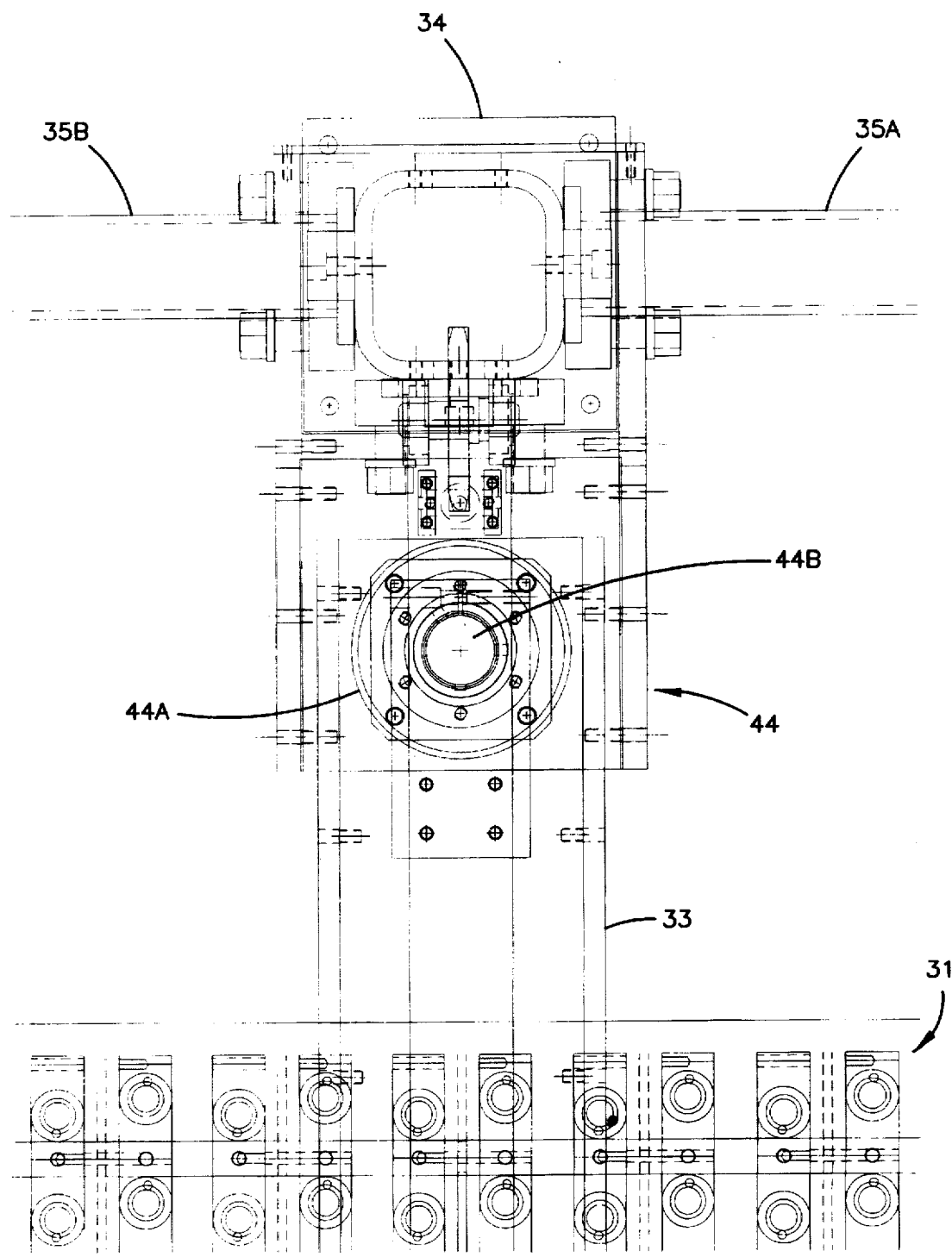
FIG. 8 is an enlarged top view of the device of FIG. 2.

The frame 31 is attached to a bar 32 and a horizontal support arm 33 (see also FIGS. 6 and 7). The arm 33 is movably attached via connecting member 45 to a vertical support member 34, which is supported by a base 35. The base 35 typically includes: support leg assemblies 35A and 35B, which are connected to vertical support member 34 and are to be connected to or placed in contact with a floor or similar supporting structure; and horizontal support members 35C and 35D, which connect legs 35A and 35B to the vertical support member 34 (see FIG. 3).

The arm 33 can be configured with an internal chamber connected to the lift vacuum line so that it functions as a vacuum reservoir in the event system vacuum is lost. This would prevent a rapid drop of the object being held by the frame 31.

Figure 4:
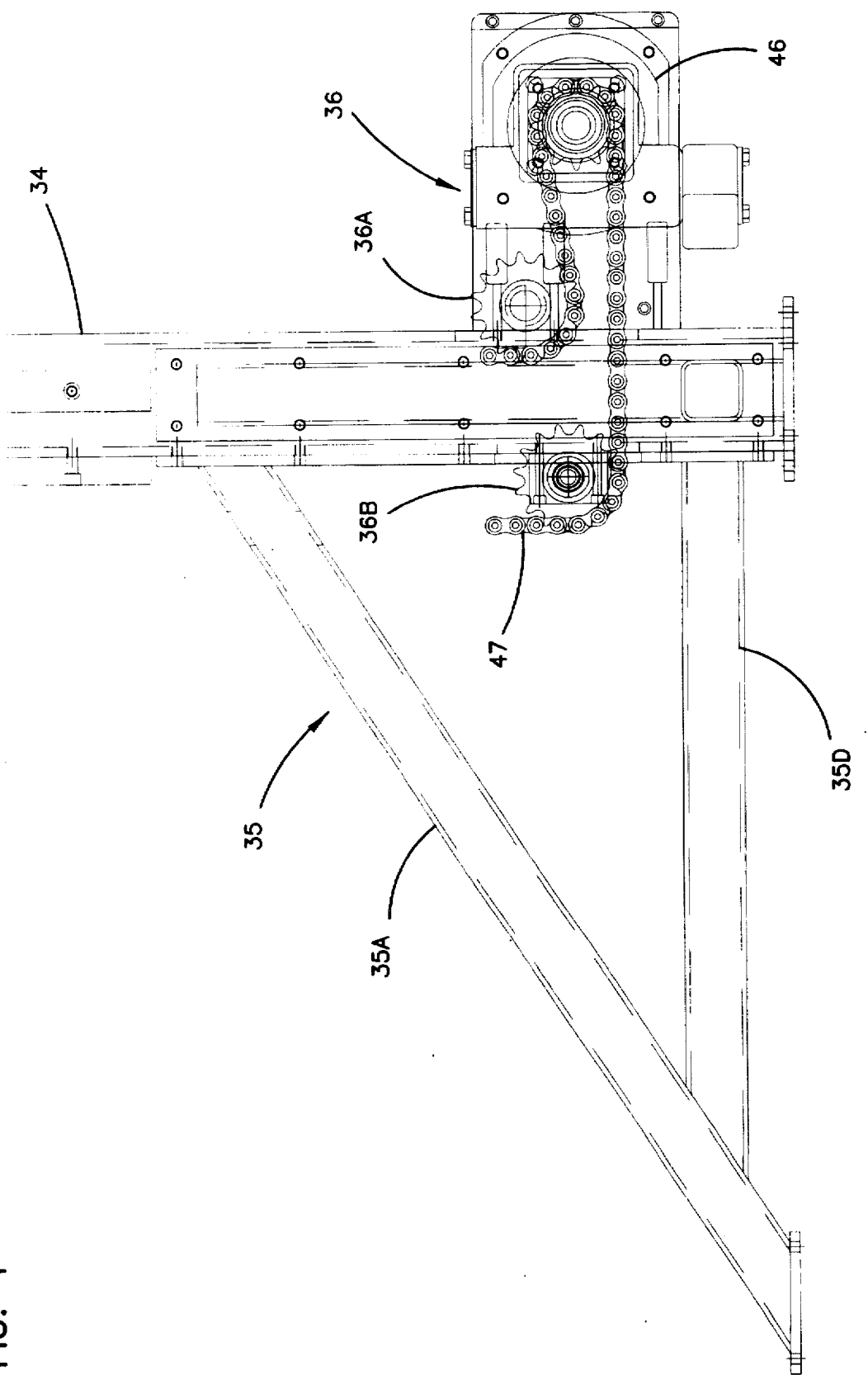
FIG. 4 is an enlarged side view of a first motor unit in the device of FIG. 2.

A first drive mechanism 36 uses a conventional chain drive in order to raise and lower the arm 33, which in turn raises and lowers the frame 31. The first drive mechanism 36 includes a motor 46 mechanically coupled to a drive chain 47. The motor 46 is also electrically connected to a control circuit, explained below. The drive chain 47 is guided by gears 36A and 36B, and is connected to member 45. A first end 47A of the chain 47 is connected to member 45 by tensioner member 36C. A second end 47B of the chain 47 is connected to member 45 by clevis member 36D. The member 45 includes rollers 45A–45D which can roll along bearing rail 48 in order to allow member 45 to move up and down along vertical support member 34 (see also FIG. 8). Accordingly, the motor 46 can drive the chain 47 in order to move member 45 and thus the frame 31 along vertical support member 34. FIG. 4 is an enlarged side view of the first drive mechanism 36.

Figure 5:
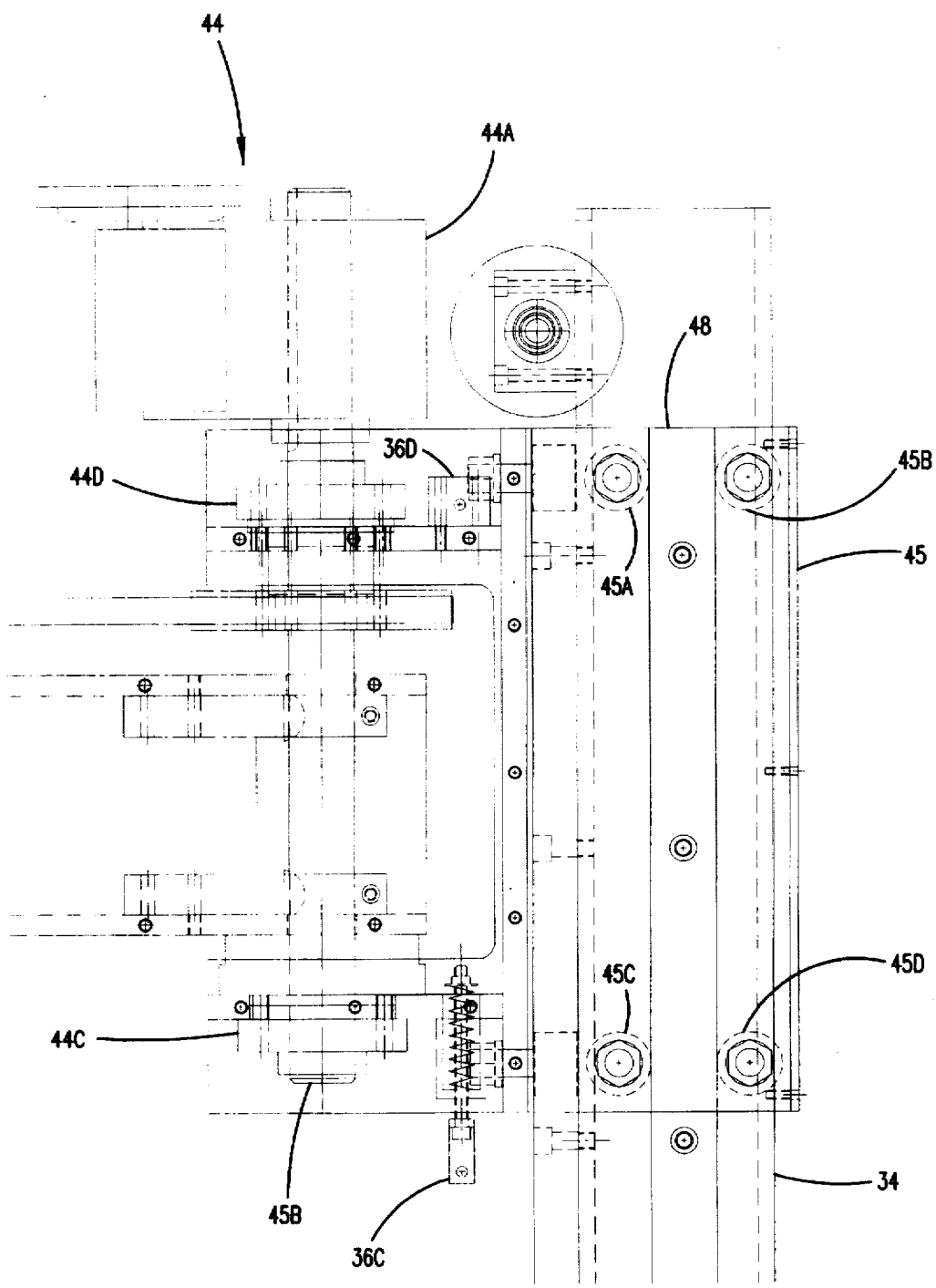
FIG. 5 is an enlarged side view of a second motor unit in the device of FIG. 2.

A second drive mechanism 44 can rotate arm 33 and frame 31 with respect to vertical support member 34 (see FIGS. 2 and 5). The second drive mechanism 44 includes a motor 44A coupled to a shaft 44B. The motor 44A is also electrically connected to a control circuit, explained below. The shaft 44B is coupled to arm 33 and can rotate within bearings 44C and 44D. A chain 44E through a rotatable gear 44F and a rigid gear 44G moves the frame 31 relative to the motor 44A. Therefore, the motor 44A can drive shaft 44B in order to rotate arm 33 and frame 31 in a horizontal plane. Frame 31 rotates in an opposite direction to the rotation of arm 33 as motor 44A is operated.

Using the drive mechanisms 36 and 44, the device 30 can lower the frame 31 in order to contact an object, such as a plurality of boxes, and detect which vacuum cups are obstructed, as explained above. The device 30 can then be programmed to activate the lifting vacuum force and raise arm 33, which in turn raises the frame 31 with the attached objects lifted by the vacuum force. The device 30 can then be programmed to additionally rotate arm 33 and lower arm 33 and frame 31 in order to, for example, place the lifted objects onto a conveyor belt or other location, and then reset the apparatus and repeat this process. Other constructions to support and move frame 31 are possible to achieve the desired lifting and movement of the objects.

Figure 9:
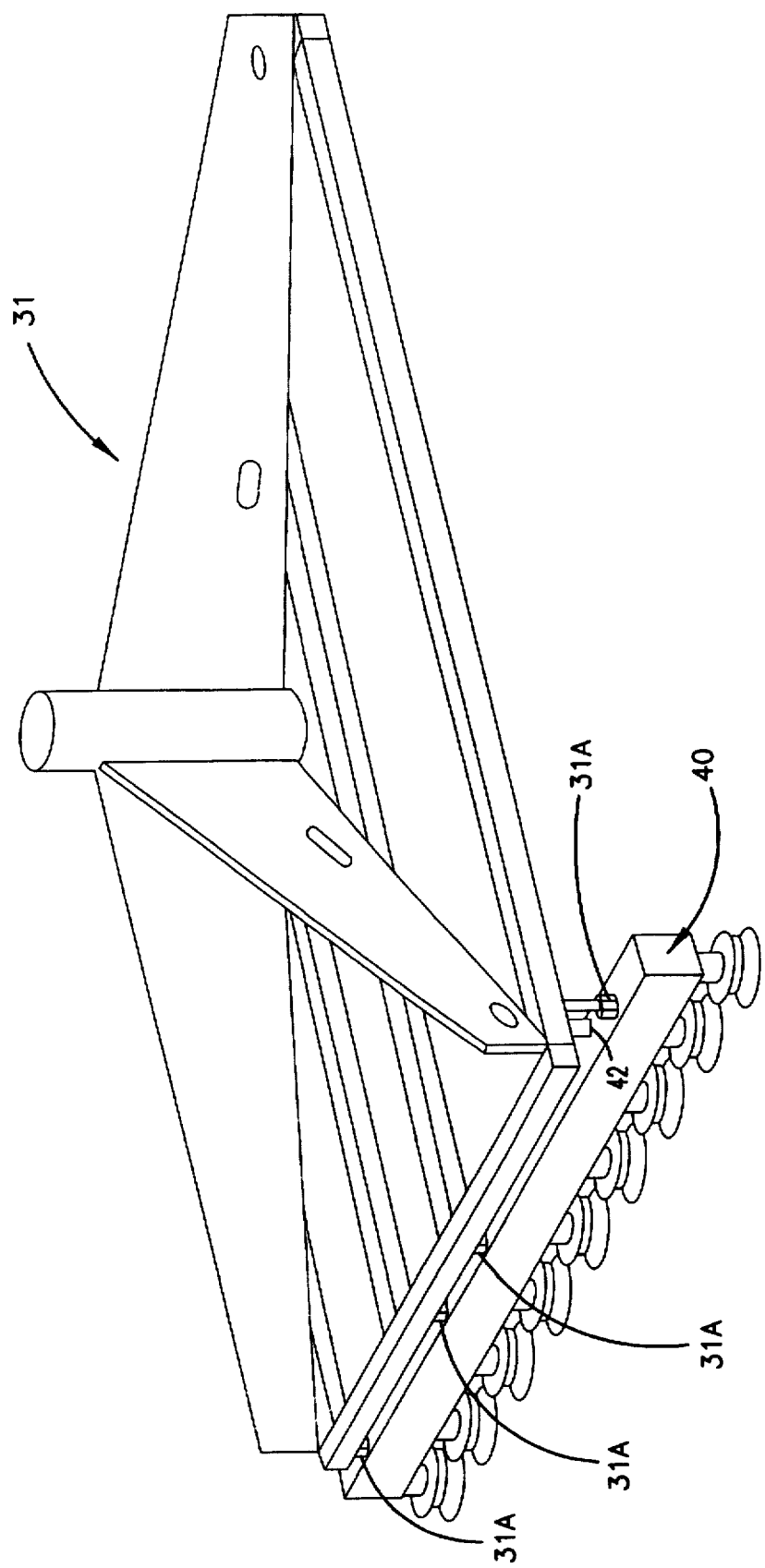
FIG. 9 is a perspective view of a frame for holding the vacuum cup apparatus in the device of FIG. 2.

FIG. 9 is a perspective view of the frame 31 and illustrates how the device 30 detects when the vacuum cups attached to the frame 31 come in contact with an object. A vacuum bar 40 is movably coupled by brackets 31a to the frame 31 and includes the plurality of vacuum cups and associated apparatus. Brackets 31a are preferably 2 piece elbow style linkages that permit upward movement of the 10 vacuum bar 40 when an object is beneath one or more of the vacuum cups of that bar other linkages and mechanisms are possible. A through-beam 42 is electrically coupled to control circuitry, explained below, and is also attached to frame 31. The through-beam 42 projects a beam to a corresponding detector (not shown) on an opposite side of frame 31 adjacent to the opposite end of vacuum bar 40.

When the vacuum bar and corresponding vacuum cups come in contact with an object, the vacuum bar is lifted up slightly and the through-beam is thus no longer projecting through to the detector, which causes the associated control circuitry to stop the lowering the frame 31. The through-beam 42 and corresponding detector may be implemented with T18 series opposed mode sensor pairs (direct current sensors) by Banner Engineering Corp., Minneapolis, Minn. Other sensors can be used to automatically detect when one or more boxes is located by the apparatus 1 and frame 31.

Each bar 40 can be made of two independent ends. Each end can be independently activated so as to avoid inefficient use of the lift vacuum if the load was offset relative to the bar 40. In one embodiment, there are nine (9) bars 40, each independent bar 40 having independently operable ends, with each bar end having eighteen (18) vacuum cups 22 (two rows of nine (9), see FIG. 7). Separate bar ends is preferred, but it is optional. The number of vacuum cups per bar 40 can be varied as desired.

The various vacuums and the reset pressure can be supplied to the manifold 10 from a central manifold unit linked to each manifold 10 by appropriate hoses. The central manifold unit can be mounted to the frame 31 for movement with the frame 31. The various vacuums can be supplied from a single vacuum source, and the reset pressure can be supplied from conventional factory air pressure. The central manifold unit may include various constructions. One suitable construction is to provide aluminum manifold bars connected to a vacuum source and connected to the vacuum bars 40. BIMBA cylinders and appropriate orifice constructions in the manifold bars allow for the proper vacuums to be supplied. Through electric control of the BIMBA cylinders, the various vacuums can be supplied at the appropriate time and for the appropriate duration during operation of device 30.

Figure 10:
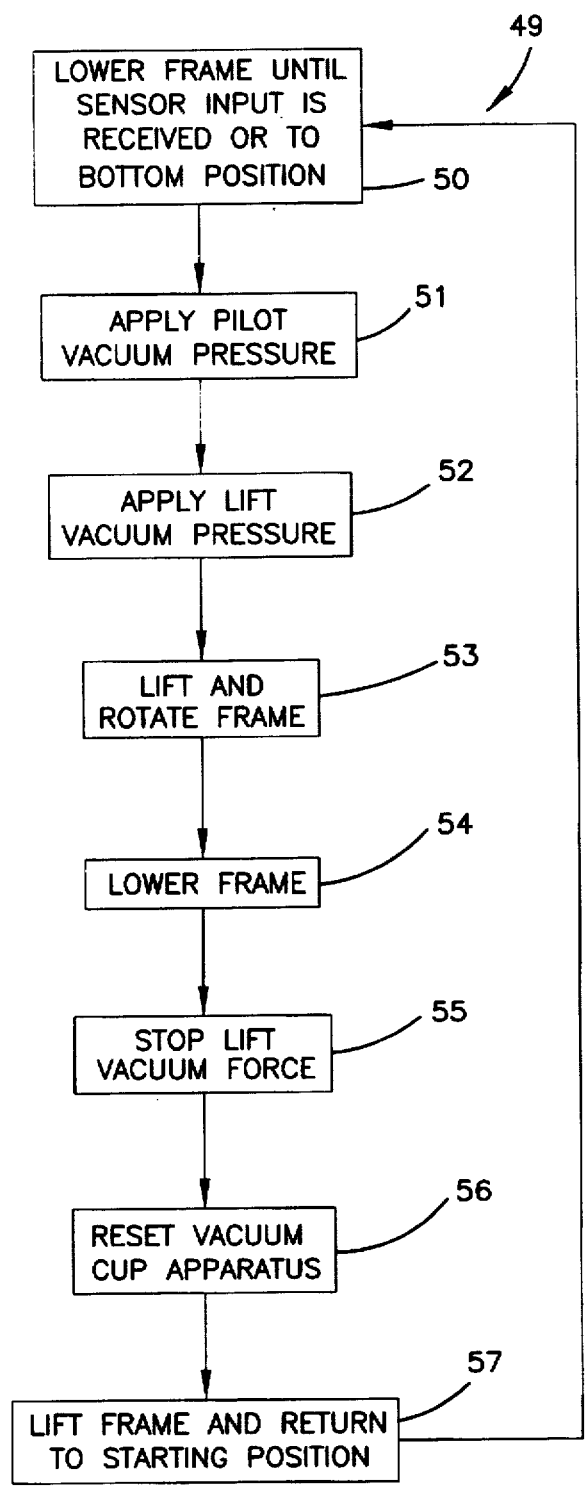
FIG. 10 is a flow chart of a preferred process for controlling operation of the vacuum cup apparatus of FIG. 1 and the device of FIG. 2.
Figure 11A:
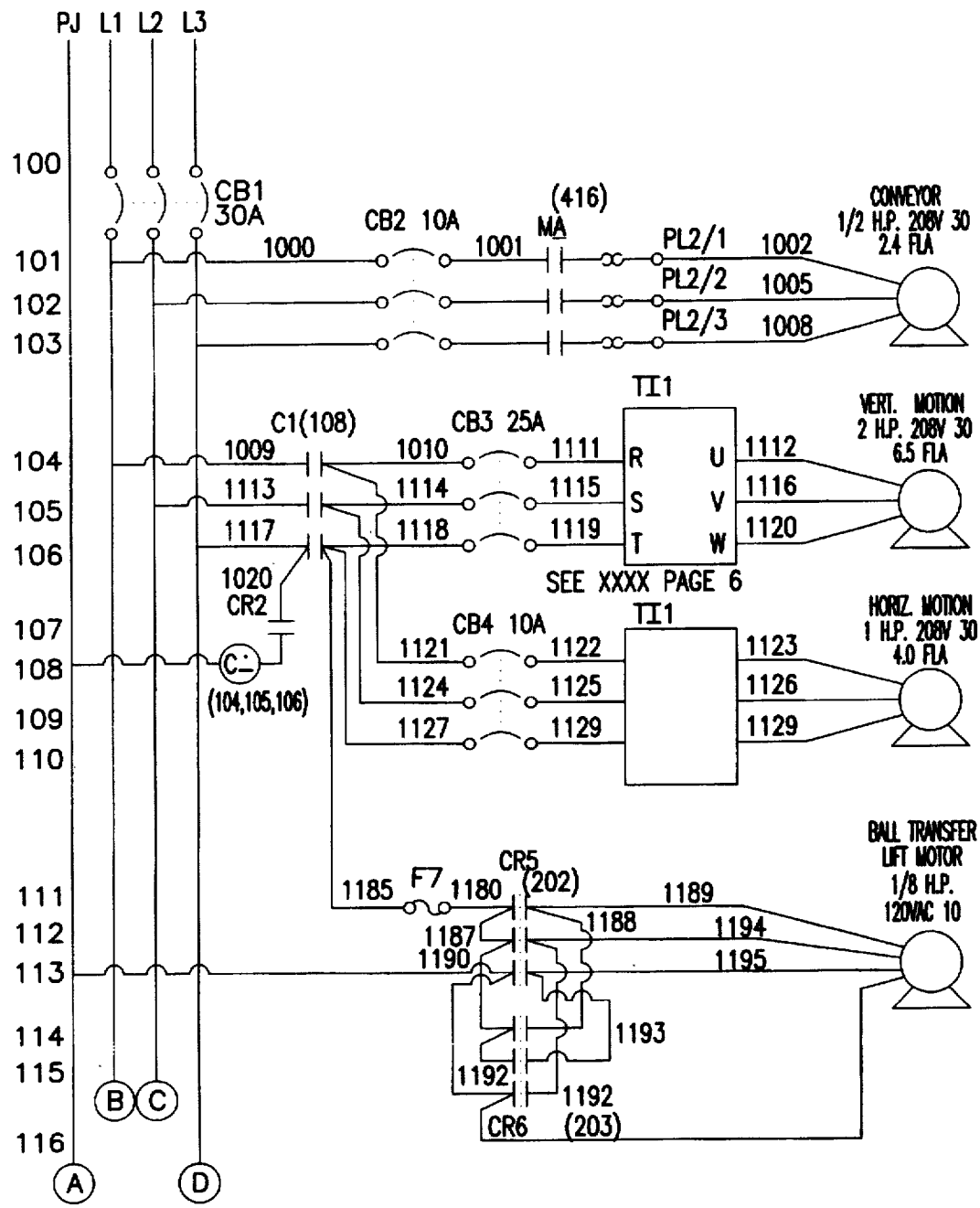
FIGS. 11A–11J are a schematic diagram of a circuit for controlling operation of the vacuum cup apparatus of FIG. 1 and the device of FIG. 2.
Figure 11B:
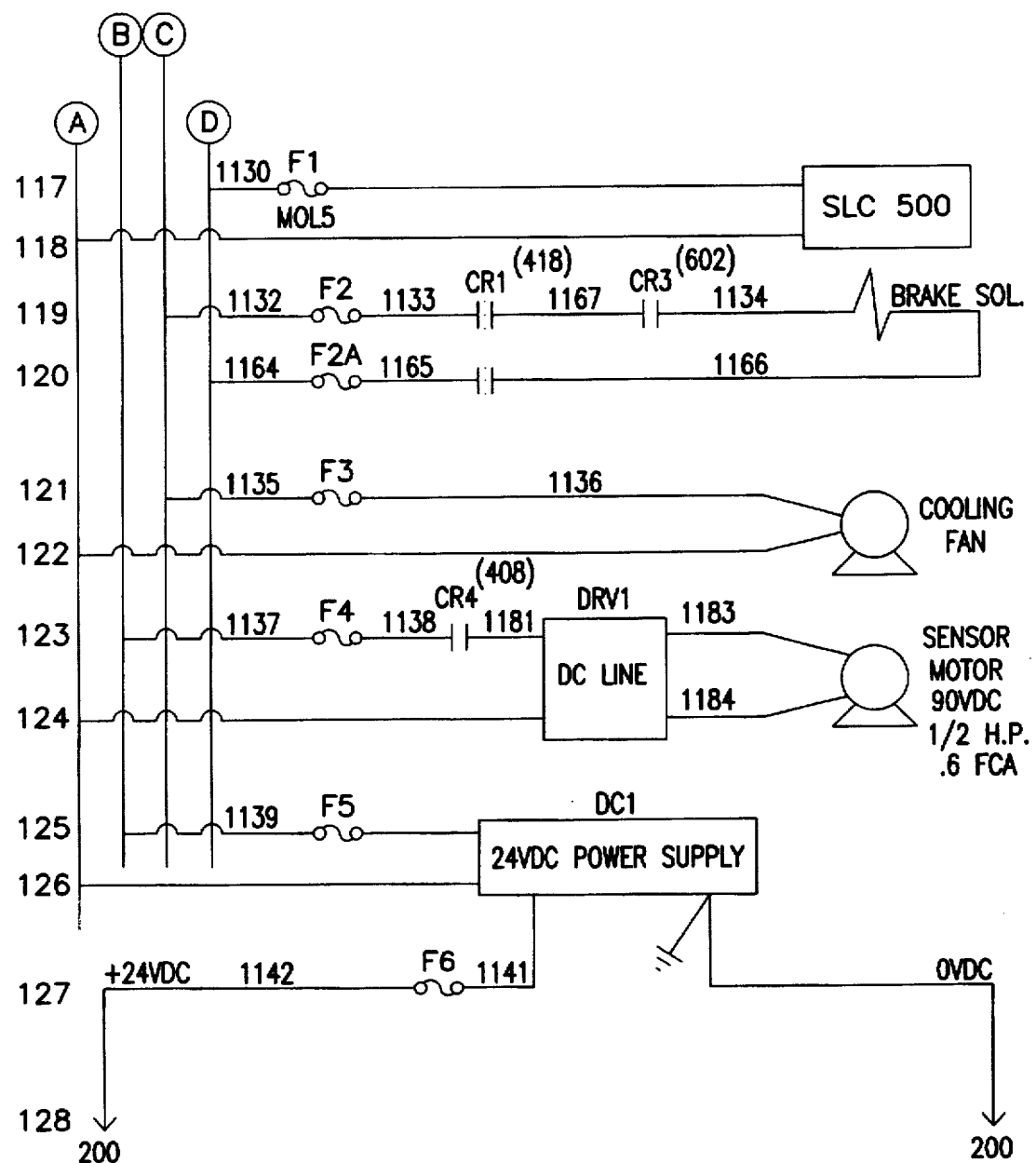
Figure 11C:
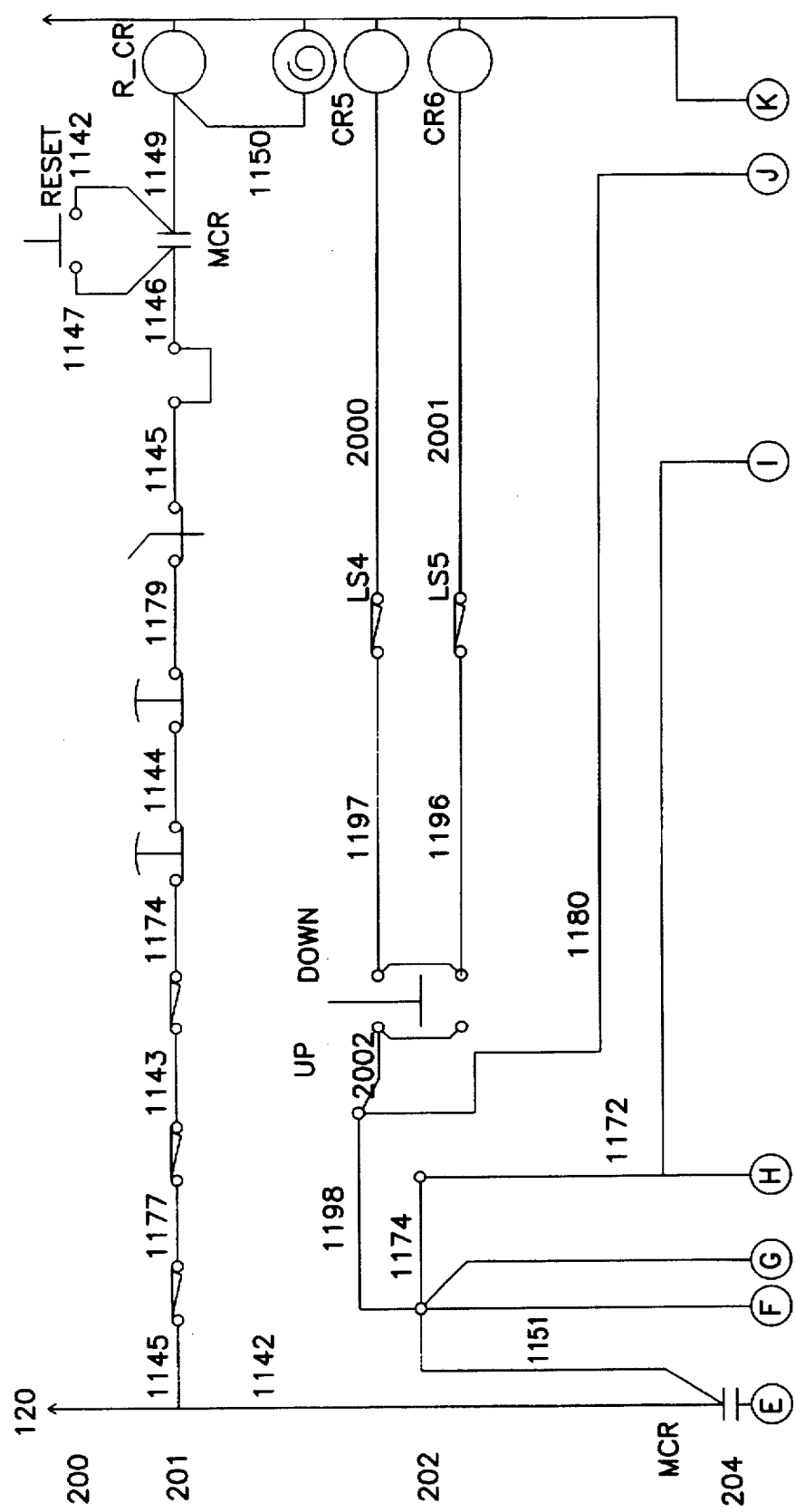
Figure 11D:
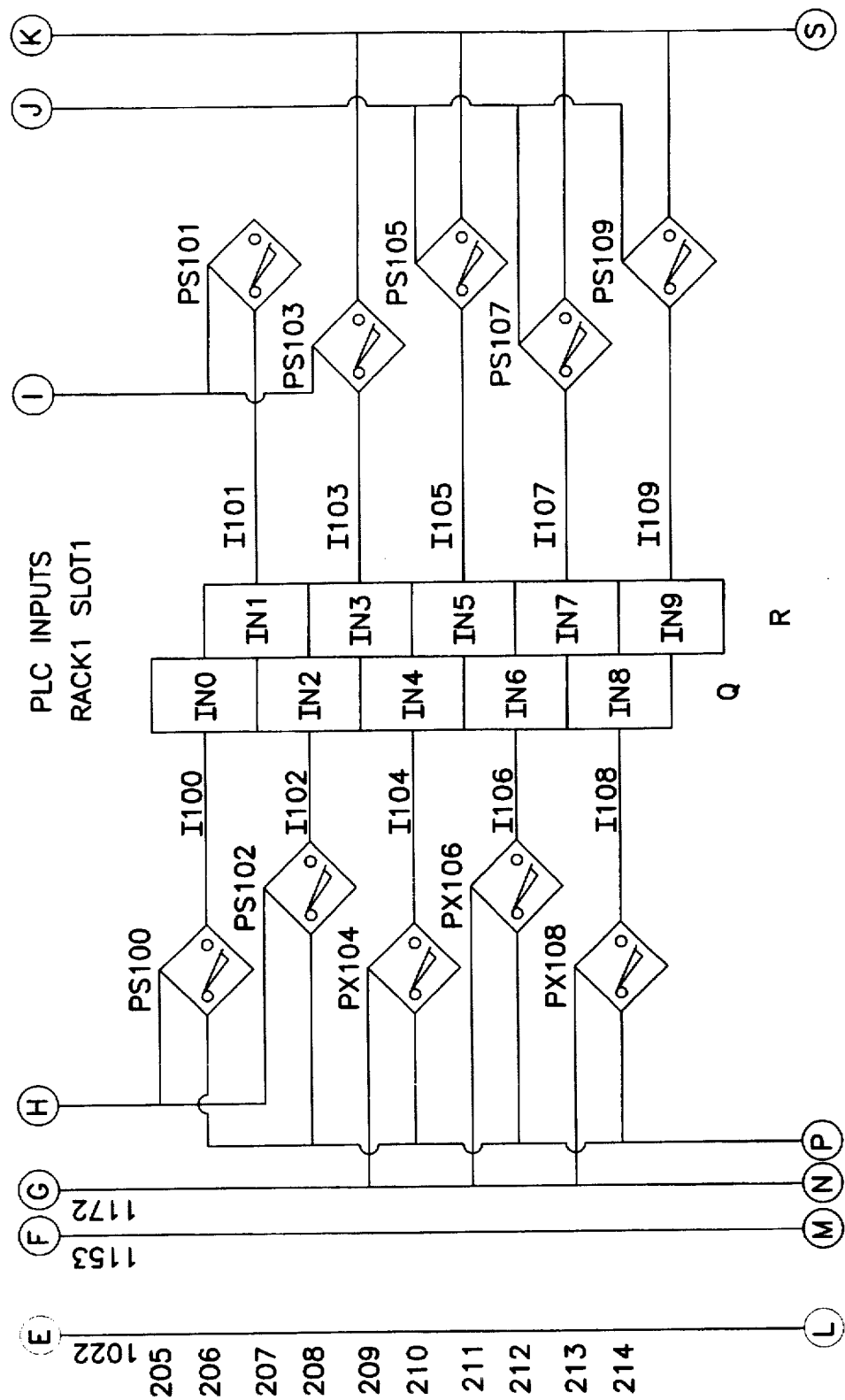
Figure 11E:
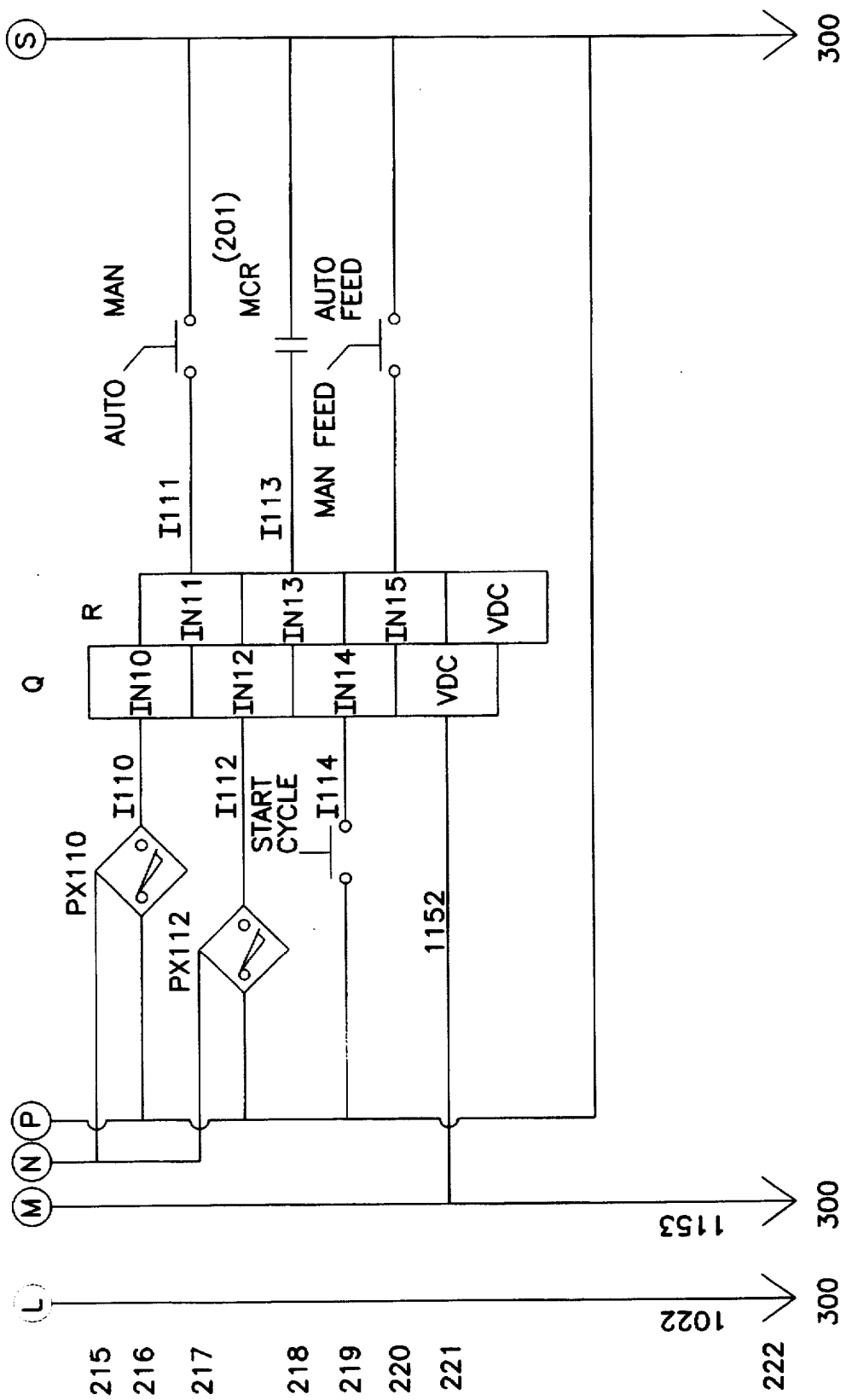
Figure 11F:
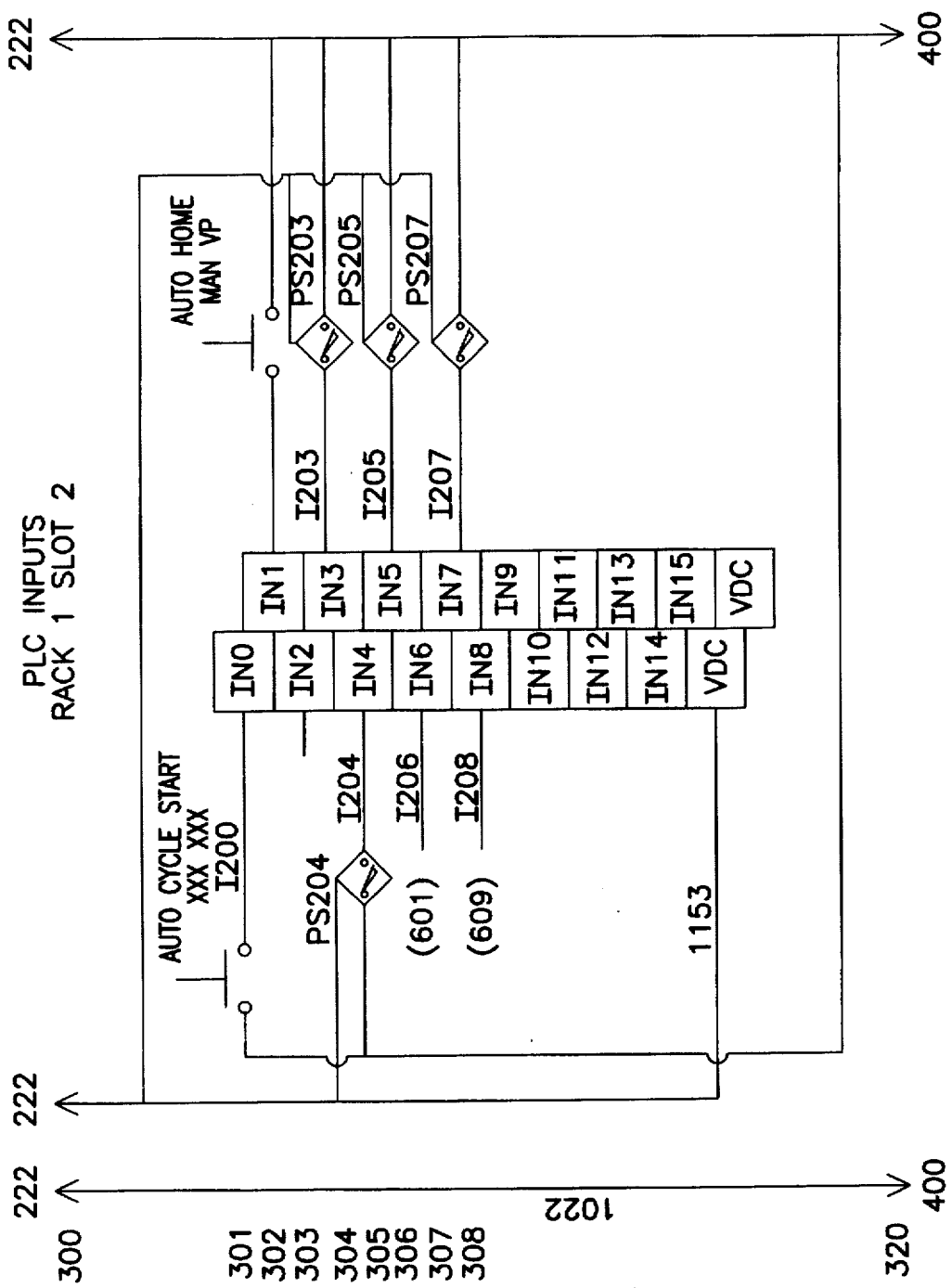
Figure 11G:
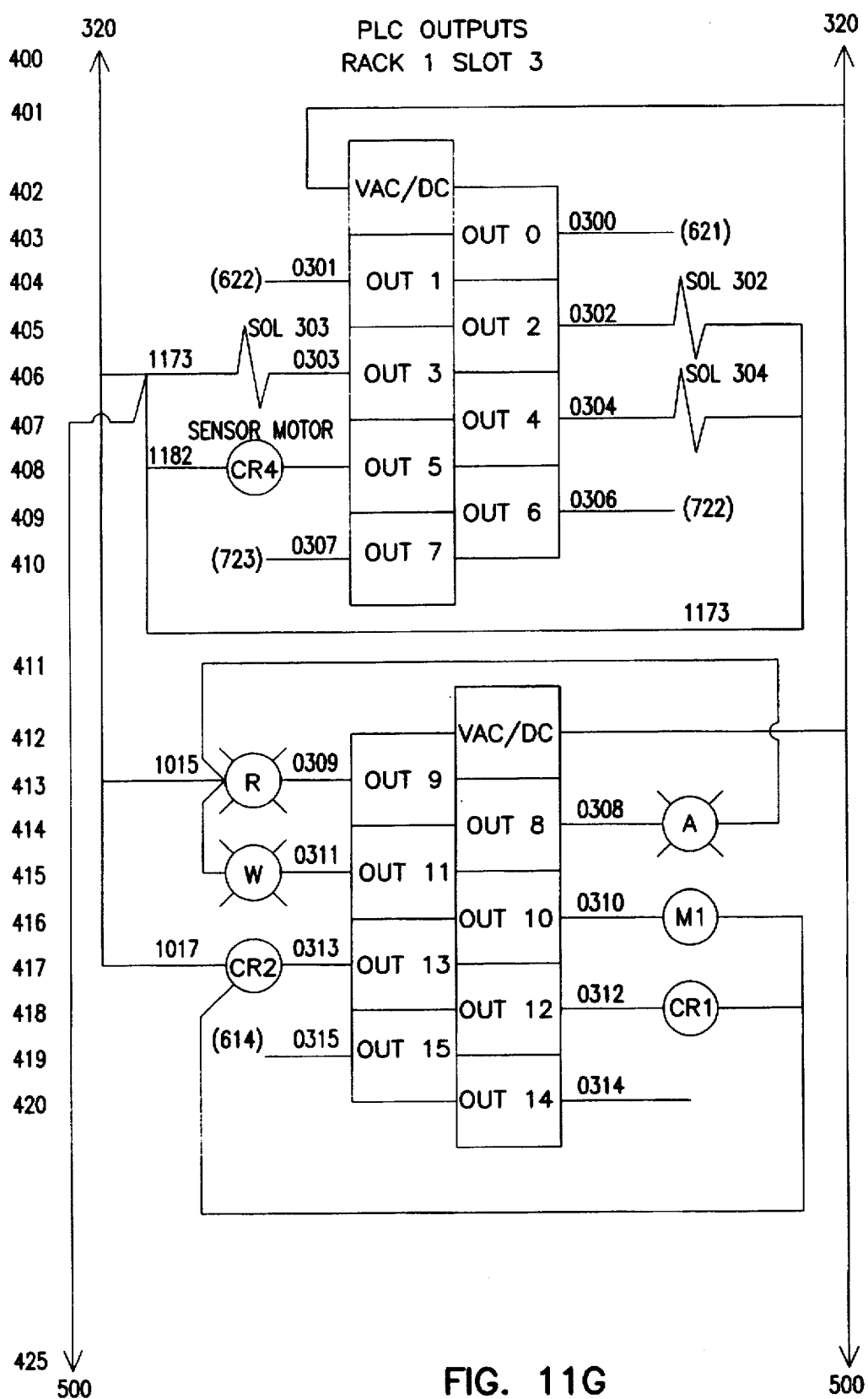
Figure 11H:
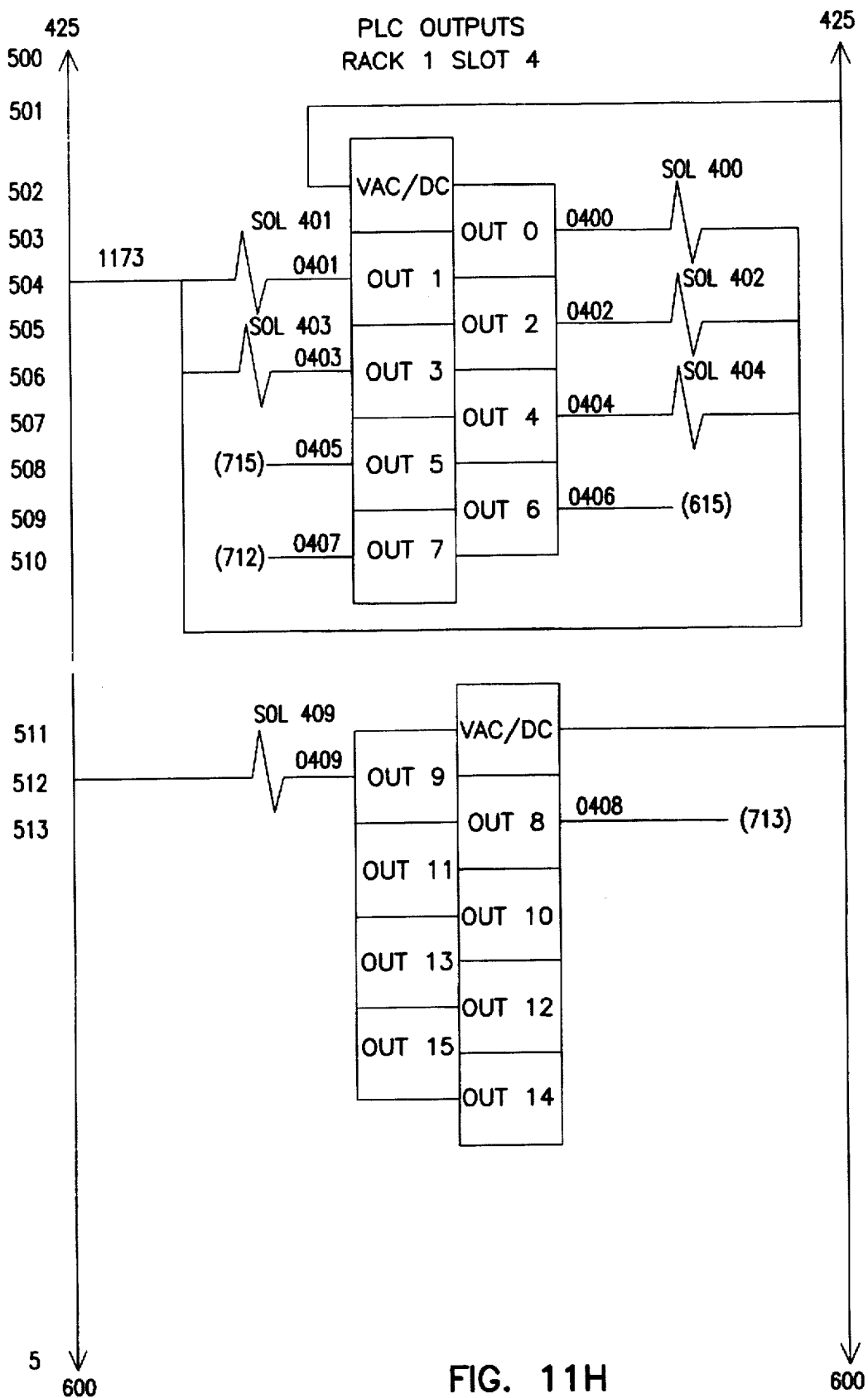
Figure 11I:
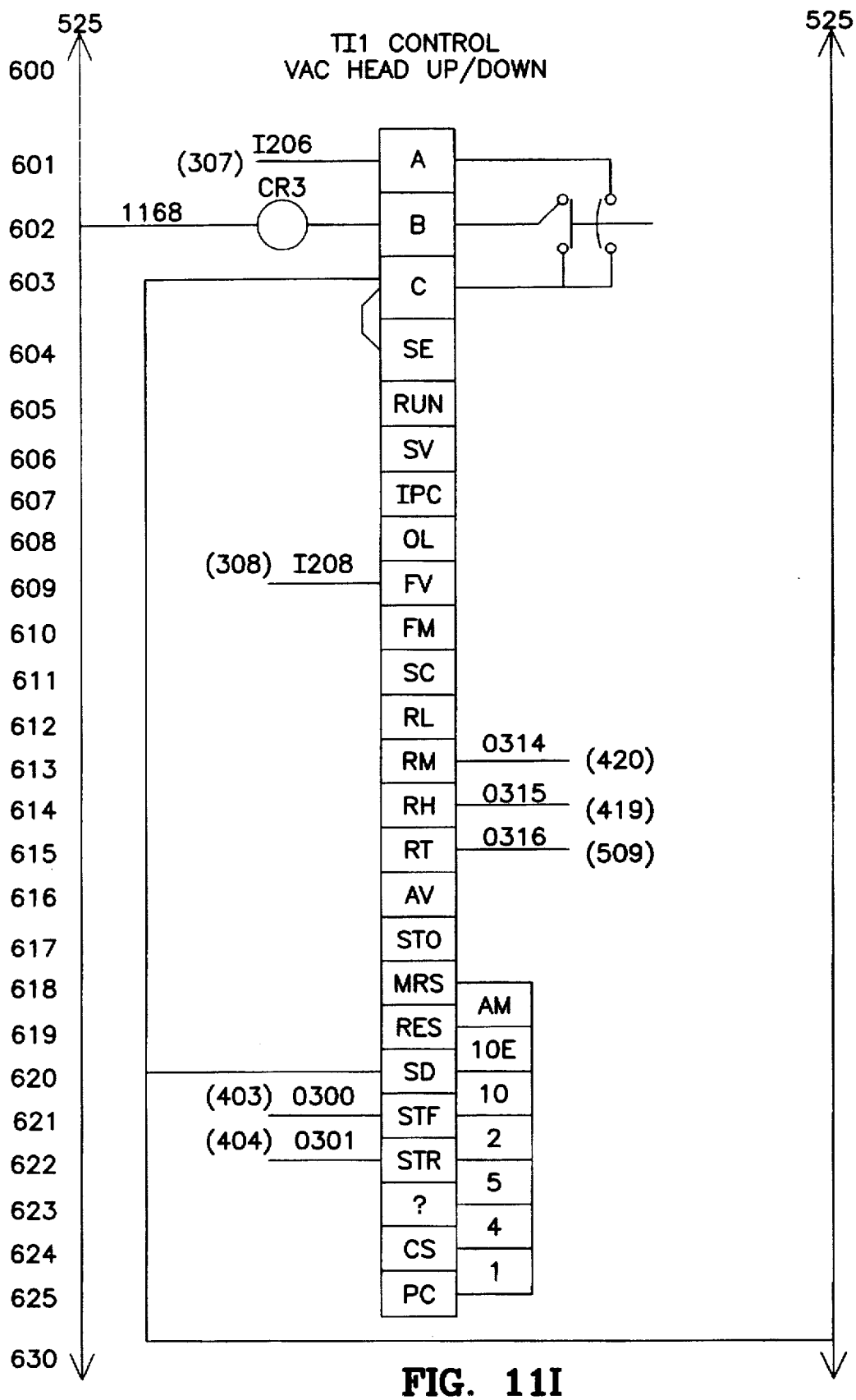
Figure 11J:
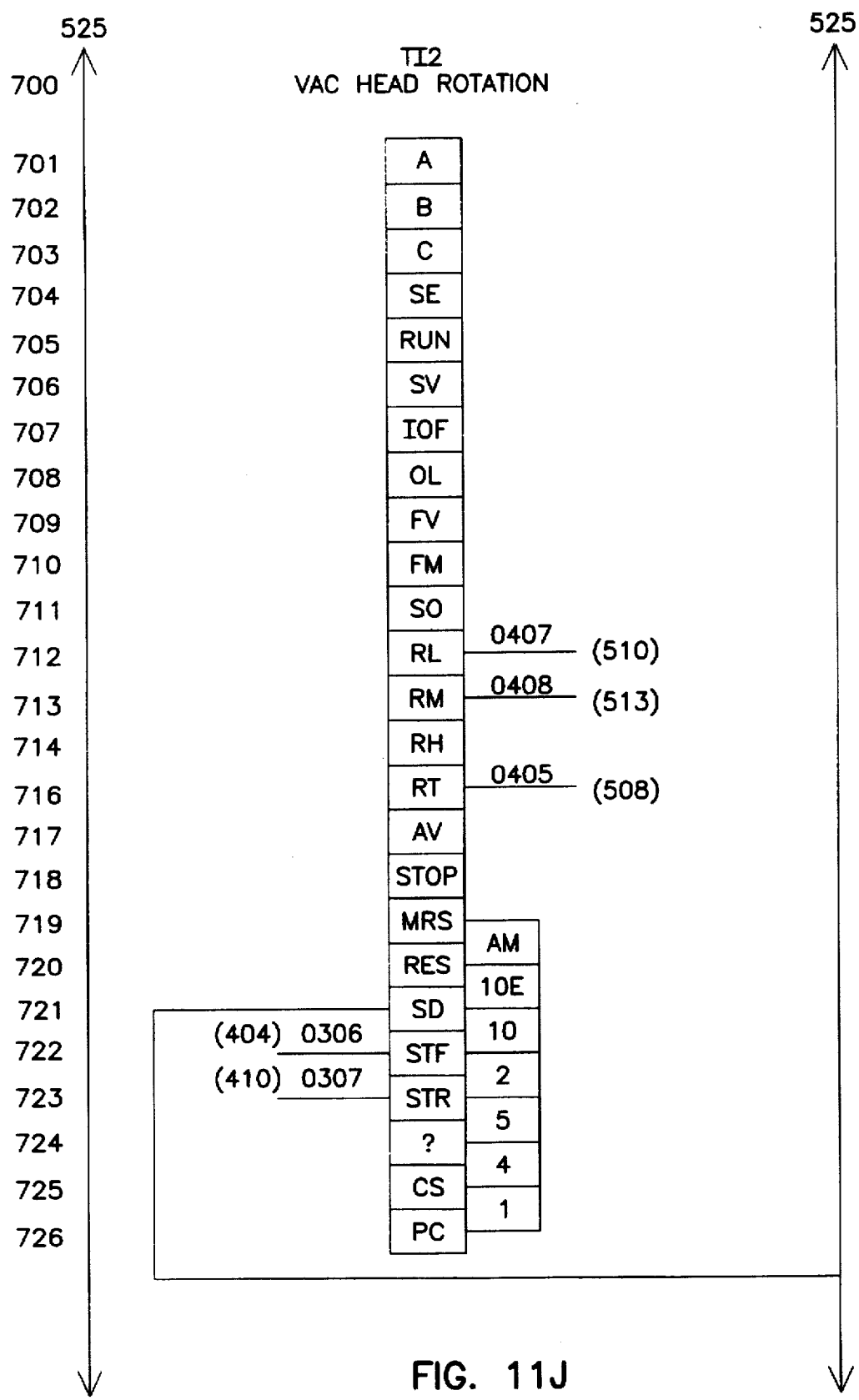

FIG. 10 is a flow chart of a preferred process 49 for controlling operation of the vacuum cup apparatus L and device 30. At step 50, the frame is lowered using the first drive mechanism 36 until the sensor input is received from the through-beam 42 and corresponding detector or to a bottom position along the vertical support member 34. At steps 51 and 52, the pilot vacuum pressure and subsequently the lift vacuum pressure are applied, as explained above, in order to determine which vacuum cups are obstructed and "lift" objects obstructing the vacuum cups. At step 53, frame is lifted and rotated using the first drive mechanism 36 and the second drive mechanism 44 respectively. At step 54, the frame is lowered using the first drive mechanism 36. This step may be performed in order to, for example, place the "attached" objects onto a conveyor belt. At step 55, the lift vacuum force is stopped or reduced in order to "detach" or remove the objects held by the lift vacuum force. At step 56, the vacuum cup apparatuses are reset as explained above. At step 57, the frame is lifted and returned to its starting position so that the process 49 can be repeated.

FIGS. 11A–11J are a schematic diagram of circuitry or programmed logic for controlling operation, as explained above, of the vacuum cup apparatus 1 and the device 30. An Allen-Bradley PLC (programmable logic computer) and Allen-Bradley ladder logic is preferably used to program the operation of the vacuum cup apparatus 1 and the device 30. An exemplary program listing of this ladder logic, used in conjunction with the circuit of FIGS. 11A–11J, is shown in Appendix A. Table 1 includes an identification of components in the circuit of FIGS. 11A–11J. Alternatively, the vacuum cup apparatus 1 and the device 30 could be controlled using a programmed microprocessor.

TABLE 1

| | |
|---|---|
| M1 | MOTOR STARTER |
| CB | CIRCUIT BREAKER |
| C1 | CONTACTOR |
| F1–F7 | FUSES |
| TT1 + TT2 | VARIABLE SPEED AC DRIVES |
| SOL | SOLENOID |
| DC1 | 24V DC POWER SUPPLY |
| MRC | MASTER CONTROL RELAY |
| CR | CONTROL RELAY |

TABLE 1-continued

| | |
|---|---|
| PX | INDUCTIVE DISK SENSOR |
| PS | PHOTOELECTRIC SENSOR |
| DRV | DC DRIVE |
| LS1–5 | LIMIT SWITCHES |
| | CONDUCTOR COLOR CODE |
| BLACK | LINE VOLTAGE POWER AND CONTROL |
| WHITE | AC NEUTRAL |
| BLUE | 24VDC |
| WHITE W/BLUE STRIPE | 0VDC (COMMON) |
| PS100–PS103 | THROUGH BEAMS OVER VAC CUPS |
| PX104 | VAC HEAD OVER SKID |
| PS105 | RETROREFLECTIVE MAT. AT END OF PULL TRANSFER |
| PX106 | VAC HEAD OVER CONV. |
| PS107 | RETROREFLECTIVE SENSOR ON SIDE OF CONVEYOR |
| PX108 | VAC HEAD HEIGHT REFERENCE |
| PX110 | VAC HEAD HEIGHT REFERENCE |
| PX112 | VAC HEAD HEIGHT REFERENCE |
| PS203 | ROTOR SENSOR CHECK FOR MATERIAL (BOTTOM) |
| PS204 | ROTOR SENSOR CHECK FOR MATERIAL (MIDDLE) |
| PS205 | ROTOR SENSOR CHECK FOR MATERIAL (TOP) |
| PX210 | SPEED REFERENCE INDUCTIVE PROX |
| SOL 303 | PILOT VAC 1 |
| SOL 403 | PILOT VAC 2 |
| SOL 302 | RESET AIR 1 |
| SOL 402 | RESET AIR 2 |
| SOL 304 | LIFT VAC 1 |
| SOL 404 | LIFT VAC 2 |
| SOL 400 | REDUCED VAC 1 |
| SOL 401 | REDUCED VAC 2 |

Various safety features and automatic controls can be employed, if desired. These may include various sensors and detectors to automate use of the apparatus. Many of these automated functions are illustrated in Appendix A.

While the present invention has been described in connection with a preferred embodiment thereof, it will be understood that many modifications will be readily apparent to those skilled in the art, and this application is intended to cover any adaptations or variations thereof. It is manifestly intended that this invention be limited only by the claims and equivalents thereof.

APPENDIX A

```
+------------------------------------------------+
|                                                |
|              Allen-Bradley Co.                 |
|             1747 Series Software               |
|              APS Release 2.01                  |
|            Documentation Utility               |
|              Program Listing                   |
|                                                |
|                    NEW                         |
|                                                |
|          Processor File: 1234.ACH              |
|                                                |
+------------------------------------------------+
```

```
NEW                                                    March 17, 1995   Page 1
Program Listing          Processor File: 1234.ACH                       Rung 2:0

Rung 2:0
    SEL SW                              latched
    ON/OFF MAT                          skid done
    I:1.0             B3              B3                                    B3
-+----] [-----+------] [--++-----]/[-------------------------------------( )--
    15        |       56   |       113                                     250
              |      B3    |
              +------] [---+
                     250
   RST AFTER
   E-STOP
      B3       B3
+----] [------] [----------+
      21       54

B3/21
            -] [-   2:0 2:12 2:23 2:30 2:31 2:37 2:50 2:62 2:92
            -( )-   2:12

B3/54
            -] [-   2:0 2:23 2:24
            -]/[-   2:26
            -( )-   2:24

B3/56
            -] [-   2:0 2:24 2:27 2:28 2:39 2:40 2:90
            -]/[-   2:51
            -( )-   2:26

B3/113
            -] [-   2:35 2:51 2:52 2:53 2:88
            -]/[-   2:0 2:34 2:38 2:89
            -( )-   2:51

B3/250
            -] [-   2:0 2:1
            -( )-   2:0

I:1.0/15
            -] [-   2:0 2:89

Rung 2:1                                                           amber lght
    B3                                                                  O:3.0
--] [---------------------------------------------------------------( )-----
   250                                                                    8

B3/250
            -] [-   2:0 2:1
            -( )-   2:0
```

```
NEW                                                March 17, 1995   Page 2
Program Listing         Processor File: 1234.ACH                    Rung 2:2

O:3.0/8
            -( )-  2:1

Rung 2:2
                                                                TI2
                                                                FAULT
    I:2.0                                                       O:3.0
  +--] [---------------+----------------------------------------( )----
    8                                                             9
    FAULTY AB
    SENSORS
         B3        S:4
  +----} [------] [--+
         95         5

B3/95
            -] [-  2:2  2:78  2:82
            -( )-  2:78

I:2.0/8
            -] [-  2:2
            -]/[-  2:58

O:3.0/9
            -( )-  2:2

S:4/5
            -] [-  2:2

Rung 2:3
  SAFETY
  LATCH
  COUNTER
  PROX
    I:2.0       B3                                                B3
  ----] [------[OSR]----------------------------------------------( )--
      7         149                                               148

B3/148
            -] [-  2:4
            -( )-  2:3

B3/149
            -OSR-  2:3

I:2.0/7
            -] [-  2:3  2:80
```

```
NEW                                                     March 17, 1995   Page 3
Program Listing         Processor File: 1234.ACH                         Rung 2:4

Rung 2:4
      B3                                                +TON----------------+
 -+--] [--+-----------------------------------------+TIMER ON DELAY  +-(EN)-
  |   148                                            |Timer        T4:16+-(DN)
  |                                                  |Time Base     0.01|
  |                                                  |Preset           3|
  |                                                  |Accum            0|
  |                                                  +------------------+
  |  T4:16|
  +--] [--+
      TT

B3/148
                 -] [-  2:4
                 -( )-  2:3

T4:16
                 -TON-  2:4

T4:16/TT
                 -] [-  2:4

Rung 2:5
     START           SPEED                                          DEENERGIZE
     MONITORING      TIMER                                          SOL 409
     SPEED
         B3        T4:16   T4:15                                        B3
 -+----] [-------] [-----]/[----+------------------------------------( )-----
  |   252         DN      DN    |                                       254
  |  DEENERGIZE                 |
  |  SOL 409                    |
  |       B3                    |
  +----] [----------------------+
         254

B3/252
                 -] [-  2:5 2:7
                 -( )-  2:7

B3/254
                 -] [-  2:5
                 -]/[-  2:8
                 -( )-  2:5

T4:15/DN
                 -]/[-  2:5 2:7

T4:16/DN
                 -] [-  2:5 2:6 2:7
```

```
NEW                                                          March 17, 1995   Page 4
Program Listing           Processor File: 1234.ACH                           Rung 2:6

Rung 2:6
                                                              SPEED
                                                              TIMER
        T4:16                                               +TON--------------+
     +--] [-------+---------------------------------------+TIMER ON DELAY +-(EN)-
          DN      |                                        |Timer     T4:15+-(DN)
                  |                                        |Time Base   0.01|
                  |                                        |Preset        12|
        SPEED     |                                        |Accum          0|
        TIMER     |                                        +----------------+
        T4:15     |
     +----] [-----+
           TT

T4:15
               -TON-  2:6

T4:15/TT
               -] [-  2:6

T4:16/DN
               -] [-  2:5 2:6 2:7

Rung 2:7
                       SPEED                                           START
                       TIMER                                           MONITORING
                                                                       SPEED
        T4:16          T4:15                                             B3
     +--] [--------+---]/[-------------------------------------------( )-----
         DN        |    DN                                              252
         START     |
         MONITORING|
         SPEED     |
         B3        |
     +----] [------+
         252

B3/252
               -] [-  2:5 2:7
               -( )-  2:7

T4:15/DN
               -]/[-  2:5 2:7

T4:16/DN
               -] [-  2:5 2:6 2:7
```

```
NEW                                                        March 17, 1995   Page 5
Program Listing           Processor File: 1234.ACH                         Rung 2:8

Rung 2:8
| DEENERGIZE|                                                      SAFETY       |
| SOL 409   |                                                      SOLENOID     |
|     B3    |                                                      O:4.0        |
|----]/[----------------------------------------------------------( )-----|
|     254                                                               9       |

B3/254
              -] [-   2:5
              -]/[-   2:8
              -( )-   2:5

O:4.0/9
              -( )-   2:8

Rung 2:9
| jog       |auto       |                                         AUTO START |
|   I:2.0      I:1.0    |                                                    |
|    I:2.0     I:1.0                                                   B3    |
|----] [---------]/[---------------------------------------------------( )-----|
|      0          11                                                   27    |

B3/27
              -]/[-   2:10
              -( )-   2:9

I:1.0/11
              -] [-   2:13 2:31 2:37 2:37 2:50 2:62
              -]/[-   2:9 2:14 2:16

I:2.0/0
              -] [-   2:9 2:12 2:14 2:26 2:31 2:37 2:50 2:62

Rung 2:10
STOPS MOTION (DOWN AND RIGHT) AND WON'T STAT MOTION UNTIL START BUTTONS ARE
PUSHED
|   CONV SIDE |strt cycle|AUTO START                              CONV SIDE   |
|   SENS STOP |          |                                        SENS STOP   |
|   MOTION    |          |                                        MOTION      |
|      B3        I:1.0       B3                                      B3       |
|-+----] [---------]/[--------]/[----+-----------------------------( )-----|
| |    28          14          27    |                               28       |
| | SENSOR ON                        |                                        |
| | SIDE OF                          |                                        |
| | CONV                             |                                        |
| |   I:1.0                          |                                        |
| +----]/[--------------------------+                                        |
|       7                                                                     |
```

```
NEW                                                    March 17, 1995   Page 6
Program Listing          Processor File: 1234.ACH                   Rung 2:11

B3/27
              -]/[-  2:10
              -( )-  2:9

B3/28
              -] [-  2:10
              -]/[-  2:31 2:50
              -( )-  2:10

I:1.0/7
              -]/[-  2:10 2:11

I:1.0/14
              -] [-  2:12 2:14 2:26 2:39 2:40
              -]/[-  2:10

Rung 2:11
  | SENSOR ON |                                                    FAST DECEL |
  | SIDE OF   |                                                    HORZ INV   |
  | CONV      |                                                               |
  |   I:1.0   |                                                       O:4.0   |
  +----]/[-------------------------------------------------------------( )----+
  |     7                                                              5      |

I:1.0/7
              -]/[-  2:10 2:11

O:4.0/5
              -( )-  2:11

Rung 2:12
  |  start       MCR        |                                    RST AFTER   |
  |  cycle                                                        E-STOP     |
  |                                                                          |
  |   I:1.0     I:1.0                                                 B3     |
  +----] [---+----] [--------------------------------------------------( )---+
  |    14    |    13                                                  21     |
  | jog      |
  |   I:2.0  |
  +----] [---+
  |     0    |
  | man/up   |
  | auto/home|
  |   I:2.0  |
  +----] [---+
  |     1    |
  | RST AFTER|
  | E-STOP   |
  |    B3    |
  +----] [---+
  |    21    |

22
```

```
NEW                                              March 17, 1995   Page 7
Program Listing         Processor File: 1234.ACH                Rung 2:13

B3/21
            -] [-  2:0 2:12 2:23 2:30 2:31 2:37 2:50 2:62 2:92
            -( )-  2:12

I:1.0/13
            -] [-  2:12 2:16 2:19 2:22 2:26 2:27 2:37 2:39 2:40 2:93

I:1.0/14
            -] [-  2:12 2:14 2:26 2:39 2:40
            -]/[-  2:10

I:2.0/0
            -] [-  2:9 2:12 2:14 2:26 2:31 2:37 2:50 2:62

I:2.0/1
            -] [-  2:12 2:16 2:37
            -]/[-  2:67 2:68 2:69

Rung 2:13
 | manual
 |   I:1.0         B3                                                    B3  |
 |----] [------[OSR]----------------------------------------------------( )--|
 |     11         25                                                     26  |

B3/25
            -OSR-  2:13

B3/26
            -]/[-  2:14
            -( )-  2:13

I:1.0/11
            -] [-  2:13 2:31 2:37 2:37 2:50 2:62
            -]/[-  2:9 2:14 2:16

Rung 2:14
LATCH BIT FOT AUTO, MOTION WON'T START UNTIL "START CYCLE" OR "JOG" IS
ACTIVATED. LATCHES OUT MOTION AFTER A JOG UNTIL P.B.'S PRESSED
 |   auto         start                                             AUTO OFF|
 |                cycle                                                      |
 |                                                                           |
 |    I:1.0        I:1.0         B3                                      B3  |
 -+----]/[-----+----] [-----+--]/[----------------------------------( )------|
 |     11      |    14      |   26                                      24  |
 |             |  jog       |                                               |
 |             |  I:2.0     |                                               |
 |             +----] [-----+                                               |
 |                   0                                                      |
```

23

```
NEW                                                            March 17, 1995   Page 8
Program Listing          Processor File: 1234.ACH                          Rung 2:14
    +++                            +++
|   |  AUTO OFF                     |                                               |
|   |       B3                      |                                               |
|   +----] [---------------------+                                                  |
|           24                                                                      |

B3/24
                -] [-  2:14 2:31 2:37 2:50 2:62
                -( )-  2:14

B3/26
                -]/[-  2:14
                -( )-  2:13

I:1.0/11
                -] [-  2:13 2:31 2:37 2:37 2:50 2:62
                -]/[-  2:9 2:14 2:16

I:1.0/14
                -] [-  2:12 2:14 2:26 2:39 2:40
                -]/[-  2:10

I:2.0/0
                -] [-  2:9 2:12 2:14 2:26 2:31 2:37 2:50 2:62

Rung 2:15
|  REFERANCE   |up limit                                                            |
|  PROX        |                                                                    |
|   I:1.0       I:1.0                                                            B3 |
|----]/[--------] [---------------------------------------------------------( )-- |
|     10         12                                                             156|

B3/156
                -] [-  2:18
                -]/[-  2:16 3:0
                -( )-  2:15

I:1.0/10
                -] [-  2:35 2:37 2:72 2:75 2:87
                -]/[-  2:15 2:32 2:59 2:74 2:76 2:77 2:88

I:1.0/12
                -] [-  2:15 2:32 2:59 2:86 2:87 2:88
                -]/[-  2:35 2:37
```

24

```
NEW                                                        March 17, 1995   Page 9
Program Listing           Processor File: 1234.ACH                        Rung 2:16
Rung 2:16
  MCR       |man/up    |auto
            |auto/home |
   I:1.0      I:2.0      I:1.0      B3         B3              B3              B3
 ----] [-----] [--------]/[-------]/[--+---]/[--------+--[OSR]------------( )--
     13         1          11        120 |   156              |   121             122
                                         |  head over         |
                                         |  skid              |
                                         |   I:1.0            |
                                         +----]/[------+
                                                4

B3/120
              -] [-   2:27
              -]/[-   2:16
              -( )-   2:27

B3/121
              -OSR-   2:16

B3/122
              -] [-   2:19
              -]/[-   2:24 2:28 2:34 2:35 2:39 2:40 2:41 2:44 2:45 2:47 2:49 2:51
                      2:58 2:61 2:64 2:70 2:71 2:72 2:74 2:75 2:77 2:78
              -( )-   2:16

B3/156
              -] [-   2:18
              -]/[-   2:16 3:0
              -( )-   2:15

I:1.0/4
              -] [-   2:18 2:25 2:26 2:32 2:34 2:41 2:86
              -]/[-   2:16 2:61 3:1

I:1.0/11
              -] [-   2:13 2:31 2:37 2:37 2:50 2:62
              -]/[-   2:9 2:14 2:16

I:1.0/13
              -] [-   2:12 2:16 2:19 2:22 2:26 2:27 2:37 2:39 2:40 2:93

I:2.0/1
              -] [-   2:12 2:16 2:37
              -]/[-   2:67 2:68 2:69

Rung 2:17
   O:3.0    B3                                                                  B3
  --]/[---[OSR]--------------------------------------------------------------( )--
     7     155                                                                 150
```

```
NEW                                                    March 17, 1995   Page 10
Program Listing        Processor File: 1234.ACH                         Rung 2:18
   B3/150
                -]/[-  2:19
                -( )-  2:17 2:18

B3/155
                -OSR-  2:17

O:3.0/7
                -]/[-  2:17
                -( )-  2:62 3:1

Rung 2:18
 over skid
 prx
   I:1.0          B3        B3                                              B3
 ----] [---------] [------[OSR]---------------------------------------------( )--
      4          156       158                                             150

B3/150
                -]/[-  2:19
                -( )-  2:17 2:18

B3/156
                -] [-  2:18
                -]/[-  2:16 3:0
                -( )-  2:15

B3/158
                -OSR-  2:18

I:1.0/4
                -] [-  2:18 2:25 2:26 2:32 2:34 2:41 2:86
                -]/[-  2:16 2:61 3:1

Rung 2:19
 MCR
   I:1.0           B3        B3                                             B3
 ----] [-----+---] [---+---]/[------------------------------------------------( )--
       13   |    122  |   150                                              151
            |    B3   |
            +---] [---+
                151

B3/122
                -] [-  2:19
                -]/[-  2:24 2:28 2:34 2:35 2:39 2:40 2:41 2:44 2:45 2:47 2:49 2:51
                       2:58 2:61 2:64 2:70 2:71 2:72 2:74 2:75 2:77 2:78
                -( )-  2:16

B3/150
                -]/[-  2:19
                -( )-  2:17 2:18
```

```
NEW                                               March 17, 1995   Page 11
Program Listing       Processor File: 1234.ACH                     Rung 2:20

B3/151
              -] [-   2:19 2:20 2:21
              -( )-   2:19

I:1.0/13
              -] [-   2:12 2:16 2:19 2:22 2:26 2:27 2:37 2:39 2:40 2:93

Rung 2:20
|    B3                                                         +JSR--------------+ |
|--] [----------------------------------------------------------+JUMP TO SUBROUTINE+-|
|   151                                                         |SBR file number  3||
|                                                               +------------------+ |

3
              -JSR-  2:20

B3/151
              -] [-   2:19 2:20 2:21
              -( )-   2:19

Rung 2:21
|    B3                                                                           1 |
|--] [---------------------------------------------------------------------(JMP)--|
|   151                                                                             |

2:LBL1
              -JMP-  2:21
              -LBL-  2:94

B3/151
              -] [-   2:19 2:20 2:21
              -( )-   2:19

Rung 2:22
|  MCR                                                                              |
|    I:1.0                                                                    O:3.0 |
|----] [---------------------------------------------------------------------( )--  |
|     13                                                                        13  |

I:1.0/13
              -] [-   2:12 2:16 2:19 2:22 2:26 2:27 2:37 2:39 2:40 2:93

O:3.0/13
              -( )-   2:22
```

27

```
NEW                                                    March 17, 1995    Page 12
Program Listing         Processor File: 1234.ACH                         Rung 2:23

Rung 2:23
 | RST AFTER
 | E-STOP
 |      B3        B3                                                          O:3.0
 |----] [-----] [-----------------------------------------------------------( )--|
 |      21        54                                                             5

B3/21
                -] [-   2:0 2:12 2:23 2:30 2:31 2:37 2:50 2:62 2:92
                -( )-   2:12

B3/54
                -] [-   2:0 2:23 2:24
                -]/[-   2:26
                -( )-   2:24

O:3.0/5
                -( )-   2:23

Rung 2:24
                         UNLATCH
                         SKID DONE
 |      B3       B3       B3      B3                                            B3
 |+--] [--+--]/[-----]/[-----]/[-----------------------------------------------( )--|
 ||      54       55      202     122                                           54
 ||      B3
 |+--] [--+
 |       56

B3/54
                -] [-   2:0 2:23 2:24
                -]/[-   2:26
                -( )-   2:24

B3/55
                -]/[-   2:24
                -( )-   2:25

B3/56
                -] [-   2:0 2:24 2:27 2:28 2:39 2:40 2:90
                -]/[-   2:51
                -( )-   2:26

B3/122
                -] [-   2:19
                -]/[-   2:24 2:28 2:34 2:35 2:39 2:40 2:41 2:44 2:45 2:47 2:49 2:51
                        2:58 2:61 2:64 2:70 2:71 2:72 2:74 2:75 2:77 2:78
                -( )-   2:16

B3/202
                -]/[-   2:24
                -( )-   2:88
```

28

```
NEW                                                March 17, 1995    Page 13
Program Listing        Processor File: 1234.ACH                      Rung 2:25

Rung 2:25
| over skid
| prx
|    I:1.0       B3                                                       B3
|----] [------[OSR]------------------------------------------------------( )--|
|      4        57                                                        55

B3/55
                -]/[-  2:24
                -( )-  2:25

B3/57
                -OSR-  2:25

I:1.0/4
                -] [-  2:18 2:25 2:26 2:32 2:34 2:41 2:86
                -]/[-  2:16 2:61 3:1

Rung 2:26
|          jog              over skid  |MCR
|                           prx
|    B3       I:2.0          I:1.0      I:1.0      B3                    B3
|--]/[--+----] [-----------] [--------] [------[OSR]-------------------( )--|
|   54  |    0                4         13         58                    56
|       | start
|       | cycle
|       |  I:1.0
|       +----] [------+
|       |      14     |
|       | END CONV    |
|       | SENS TON    |
|       |   T4:9      |
|       +----] [------+
|              DN B3/54
                -] [-  2:0 2:23 2:24
                -]/[-  2:26
                -( )-  2:24

B3/56
                -] [-  2:0 2:24 2:27 2:28 2:39 2:40 2:90
                -]/[-  2:51
                -( )-  2:26

B3/58
                -OSR-  2:26

I:1.0/4
                -] [-  2:18 2:25 2:26 2:32 2:34 2:41 2:86
                -]/[-  2:16 2:61 3:1
```

```
NEW
Program Listing              Processor File: 1234.ACH      March 17, 1995
   I:1.0/13
                 -] [-  2:12 2:16 2:19 2:22 2:26 2:27 2:37 2:39 2:40 2:93
   I:1.0/14
                 -] [-  2:12 2:14 2:26 2:39 2:40
                 -]/[-  2:10
   I:2.0/0
                 -] [-  2:9 2:12 2:14 2:26 2:31 2:37 2:50 2:62
   T4:9/DN
                 -] [-  2:26

Rung 2:27
        B3           MCR
   |-+-] [-+---] [-  I:1.0                                              B3
   | | 56 |          13                                                -( )--
   | | B3 |                                                             120
   |-+-] [-+
        120

B3/56
                 -] [-  2:0 2:24 2:27 2:28 2:39 2:40 2:90
                 -]/[-  2:51
                 -( )-  2:26

B3/120
                 -] [-  2:27
                 -]/[-  2:16
                 -( )-  2:27

I:1.0/13
                 -] [-  2:12 2:16 2:19 2:22 2:26 2:27 2:37 2:39 2:40 2:93

Rung 2:28
   end rht.
   swing osr                       thru beams LOW LIMIT
       B3                            ORed
                                      B3         B3     B3              B3
   |-+----] [-----------------+---]/[-------]/[------]/[---------------( )--
   | |     2                  |     0         255    122                5
   | |          latched       |
   | +----------------] [-----+
   |                   5      |
   |                   B3     |
   +-------------------] [----+
                       56
```

```
NEW
Program Listing          Processor File: 1234.ACH      March 17, 1995   Pa
   B3/0                                                                 Rung
              -] [-  2:41 2:54 2:58
              -]/[-  2:28 2:39
              -( )-  2:38

B3/2
              -] [-  2:28 2:70
              -( )-  2:33

B3/5
              -] [-  2:28 2:31 2:41
              -( )-  2:28

B3/56
              -] [-  2:0 2:24 2:27 2:28 2:39 2:40 2:90
              -]/[-  2:51
              -( )-  2:26

B3/122
              -] [-  2:19
              -]/[-  2:24 2:28 2:34 2:35 2:39 2:40 2:41 2:44 2:45 2:47 2:49 2:51
                     2:58 2:61 2:64 2:70 2:71 2:72 2:74 2:75 2:77 2:78
              -( )-  2:16

B3/255
              -] [-  2:51
              -]/[-  2:28
              -( )-  2:87

Rung 2:29
 | inv. down                                              brake off
 |  O:3.0                                            +TOF---------------+
 |----] [-----------------------------------------+TIMER OFF DELAY +-(EN)-|
 |     1                                           |Timer       T4:0+-(DN)|
 |                                                 |Time Base   0.01|
 |                                                 |Preset         1|
 |                                                 |Accum          1|
 |                                                 +----------------+

O:3.0/1
              -] [-  2:29 2:30
              -( )-  2:31

T4:0
              -TOF-  2:29
```

31

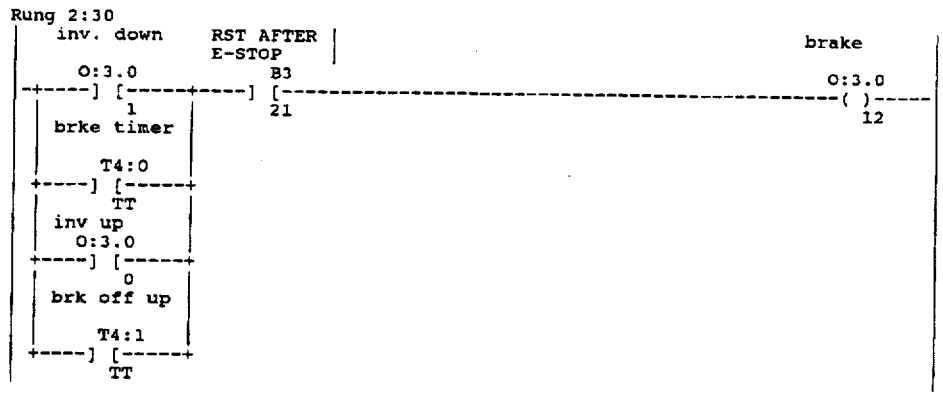
```
NEW                                              March 17, 1995   Page 16
Program Listing        Processor File: 1234.ACH                  Rung 2:30
Rung 2:30
    inv. down      RST AFTER |                              brake
                   E-STOP
     O:3.0           B3                                          O:3.0
 -+----] [----+----] [------------------------------------------( )-----
  |     1         21                                              12
  | brke timer |
  |    T4:0
  +----] [-----+
         TT
  | inv up
  |    O:3.0
  +----] [-----+
          0
  | brk off up
  |    T4:1
  +----] [-----+
          TT
B3/21
           -] [-   2:0 2:12 2:23 2:30 2:31 2:37 2:50 2:62 2:92
           -( )-   2:12
O:3.0/0
           -] [-   2:30 2:36
           -]/[-   3:1
           -( )-   2:37 3:0
O:3.0/1
           -] [-   2:29 2:30
           -( )-   2:31
O:3.0/12
           -( )-   2:30 3:0
T4:0/TT
           -] [-   2:30
T4:1/TT
           -] [-   2:30
```
32

```
NEW                                              March 17, 1995   Page 17
Program Listing        Processor File: 1234.ACH                   Rung 2:31

Rung 2:31
 | latched        AUTO OFF              RST AFTER  |CONV SIDE  |        inv down
 |                                      E-STOP     |SENS STOP  |
 |                                                 |MOTION     |
 |    B3              33                   B3           B3               O:3.0
 +---] [-----+------] [---------------+---] [--------]/[---------------(   )-----|
 |     5     |        24              |    21           28                 1
 |           |   jog       |manual    |
 |           |   I:2.0     | I:1.0    |
 |           +---] [-------] [--------+
 |                0           11

B3/5
           -] [-    2:28 2:31 2:41
           -( )-    2:28

B3/21
           -] [-    2:0 2:12 2:23 2:30 2:31 2:37 2:50 2:62 2:92
           -( )-    2:12

B3/24
           -] [-    2:14 2:31 2:37 2:50 2:62
           -( )-    2:14

B3/28
           -] [-    2:10
           -]/[-    2:31 2:50
           -( )-    2:10

I:1.0/11
           -] [-    2:13 2:31 2:37 2:37 2:50 2:62
           -]/[-    2:9 2:14 2:16

I:2.0/0
           -] [-    2:9 2:12 2:14 2:26 2:31 2:37 2:50 2:62

O:3.0/1
           -] [-    2:29 2:30
           -( )-    2:31

Rung 2:32
 |   CENTER AB            over skid                                   STRT RIGHT
 |   SENSOR               prx                                         SWING
 |    T4:5                I:1.0          B3                             B3
 +-+---] [---------+-----]/[-------] [-----[OSR]----------------------(   )----|
 | |    DN         |       4               110                          111
 | |               |
 +++              +++
```

```
NEW                                                       March 17, 1995   Page 18
Program Listing            Processor File: 1234.ACH                        Rung 2:32
  +++                        +++
  |   BOTTOM AB               |
  |   SENSOR                  |
  |      T4:6                 |
  +----] [------------------+ |
  |       DN                  |
  |   REFERANCE  |up limit    |
  |   PROX                    |
  |    I:1.0       I:1.0      |
  +----]/[---------] [------+ |
  |      10         12        |
  |   TOP AB                  |
  |   SENSOR                  |
  |     T4:13                 |
  +----] [------------------+ |
  |       DN                  |

B3/110
            -OSR-  2:32

B3/111
            -] [-  2:34 2:64
            -]/[-  2:35
            -( )-  2:32

I:1.0/4
            -] [-  2:18 2:25 2:26 2:32 2:34 2:41 2:86
            -]/[-  2:16 2:61 3:1

I:1.0/10
            -] [-  2:35 2:37 2:72 2:75 2:87
            -]/[-  2:15 2:32 2:59 2:74 2:76 2:77 2:88

I:1.0/12
            -] [-  2:15 2:32 2:59 2:86 2:87 2:88
            -]/[-  2:35 2:37

T4:5/DN
            -] [-  2:32 2:71 2:72 2:74
            -]/[-  2:75 2:77 2:78

T4:6/DN
            -] [-  2:32 2:71 2:78
            -]/[-  2:72 2:74 2:75 2:77

T4:13/DN
            -] [-  2:32
            -]/[-  2:78
```

34

```
NEW
Program Listing           Processor File: 1234.ACH         ... ..h 17, 1995   Page 1
                                                                          Rung 2:3:
Rung 2:33
 | head over  |swg to
 | conv      |conv                                                       end right  |
 |   I:1.0         B3        B3                                          swing      |
 |              B3           B3                                               B3    |
 |----] [--------] [------[OSR]--------------------------------------( )-----|
 |       6        7        101                                                2    |

B3/2
            -] [-  2:28 2:70
            -( )-  2:33

B3/7
            -] [-  2:33 2:34 2:50
            -( )-  2:34

B3/101
            -OSR-  2:33

I:1.0/6
            -] [-  2:33
            -]/[-  2:34

Rung 2:34
 |  over skid |up bit   |start rht  |head over |latched       rdy to swg |
 |  prx       |         |swing      |conv      |skid done     to conv    |
 |   I:1.0       B3        B3         I:1.0       B3      B3       B3    |
 |-+----] [--------] [--------] [----+---]/[--------]/[------]/[------( )----|
 | |    4        6        111   |      6       113     122          7    |
 | swg to                       |
 | conv                         |
 |     B3                       |
 |+----] [-----------------------+
 |     7

B3/6
            -] [-  2:34 2:35 2:37
            -( )-  2:35

B3/7
            -] [-  2:33 2:34 2:50
            -( )-  2:34

B3/111
            -] [-  2:34 2:64
            -]/[-  2:35
            -( )-  2:32

B3/113
            -] [-  2:35 2:51 2:52 2:53 2:88
            -]/[-  2:0 2:34 2:38 2:89
            -( )-  2:51
```

35

```
NEW
Program Listing          Processor File: 1234.ACH          March 17, 1995    P.
                                                                              Rung
B3/122
         -] [-  2:19
         -]/[-  2:24 2:28 2:34 2:35 2:39 2:40 2:41 2:44 2:45 2:47 2:49
                2:58 2:61 2:64 2:70 2:71 2:72 2:74 2:75 2:77 2:78
         -( )-  2:16

I:1.0/4
         -] [-  2:18 2:25 2:26 2:32 2:34 2:41 2:86
         -]/[-  2:16 2:61 3:1

I:1.0/6
         -] [-  2:33
         -]/[-  2:34

Rung 2:35
I:1/10 ORed WITH NOT I:1/12 REFERS TO NOT ON UPPER LIMIT
                     start rt       up limit    end up
                     swing osr                  over conv
       B3               B3           I:1.0        B3       B3      B3
-+--] [--------+----]/[-----+-----]/[------+---]/[------]/[---]/[-------
 |   83        |     111           12             3        85     122
 |delay btwn   |   latched                 |
 |pilot 1&2    |   skid done                ref prox
 |   T4:8      |      B3                    I:1.0
 +----] [------+   ----] [-----+           ----] [-----+
 |    DN       |      113                     10
 |  up bit     |
 |    B3       |
 +----] [------+
 |    6        |
 | osr lead    |
 | of b3/113   |
 |    B3       |
 +----] [------+
      115 up bit
                                                          <       B3
                                                          <----( )--
                                                          <       6
```

```
NEW
Program Listing        Processor File: 1234.ACH      March 17, 1995

B3/3
              -] [-   2:61 2:64
              -]/[-   2:35 2:58 2:70
              -( )-   2:60
    B3/6
              -] [-   2:34 2:35 2:37
              -( )-   2:35
    B3/83
              -] [-   2:35
              -( )-   2:83
    B3/85
              -] [-   2:60 2:85
              -]/[-   2:35
              -( )-   2:84
    B3/111
              -] [-   2:34 2:64
              -]/[-   2:35
              -( )-   2:32
    B3/113
              -] [-   2:35 2:51 2:52 2:53 2:88
              -]/[-   2:0 2:34 2:38 2:89
              -( )-   2:51
    B3/115
              -] [-   2:35
              -( )-   2:52
    B3/122
              -] [-   2:19
              -]/[-   2:24 2:28 2:34 2:35 2:39 2:40 2:41 2:44 2:45 2:47 2:49 2:51
                      2:58 2:61 2:64 2:70 2:71 2:72 2:74 2:75 2:77 2:78
              -( )-   2:16
    I:1.0/10
              -] [-   2:35 2:37 2:72 2:75 2:87
              -]/[-   2:15 2:32 2:59 2:74 2:76 2:77 2:88
    I:1.0/12
              -] [-   2:15 2:32 2:59 2:86 2:87 2:88
              -]/[-   2:35 2:37

37
```

```
NEW                                                     March 17, 1995   Page 22
Program Listing         Processor File: 1234.ACH                         Rung 2:36
T4:8/DN
                -] [-   2:35  2:45
                -]/[-   2:40  2:44
Rung 2:36
| inv up                                                          brk off up
|   O:3.0                                                 +TOF---------------+
|----] [--------------------------------------------------+TIMER OFF DELAY +-(EN)-
|    0                                                    |Timer      T4:1+-(DN)
|                                                         |Time Base  0.01|
|                                                         |Preset      150|
|                                                         |Accum       150|
|                                                         +---------------+
O:3.0/0
                -] [-   2:30  2:36
                -]/[-   3:1
                -( )-   2:37  3:0
T4:1
                -TOF-   2:36
```
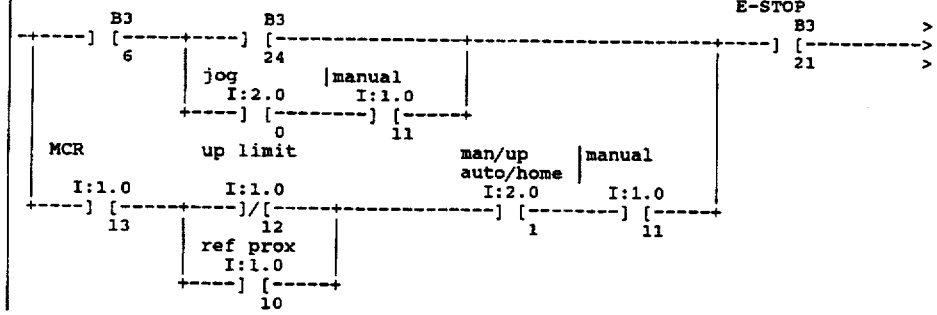
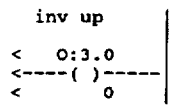

```
NEW                                                    March 17, 1995    Page 23
Program Listing        Processor File: 1234.ACH                          Rung 2:37

B3/6
              -] [-   2:34 2:35 2:37
              -( )-   2:35
B3/21
              -] [-   2:0 2:12 2:23 2:30 2:31 2:37 2:50 2:62 2:92
              -( )-   2:12
B3/24
              -] [-   2:14 2:31 2:37 2:50 2:62
              -( )-   2:14
I:1.0/10
              -] [-   2:35 2:37 2:72 2:75 2:87
              -]/[-   2:15 2:32 2:59 2:74 2:76 2:77 2:88
I:1.0/11
              -] [-   2:13 2:31 2:37 2:37 2:50 2:62
              -]/[-   2:9 2:14 2:16
I:1.0/12
              -] [-   2:15 2:32 2:59 2:86 2:87 2:88
              -]/[-   2:35 2:37
I:1.0/13
              -] [-   2:12 2:16 2:19 2:22 2:26 2:27 2:37 2:39 2:40 2:93
I:2.0/0
              -] [-   2:9 2:12 2:14 2:26 2:31 2:37 2:50 2:62
I:2.0/1
              -] [-   2:12 2:16 2:37
              -]/[-   2:67 2:68 2:69
```

```
NEW                                                      March 17, 1995   Page 24
Program Listing        Processor File: 1234.ACH                          Rung 2:38

O:3.0/0
                -] [-   2:30 2:36
                -]/[-   3:1
                -( )-   2:37 3:0

Rung 2:38
|    thru beam        latched                                                      |
|                     skid done                                                    |
|     I:1.0              B3                                                     B3 |
|-+----]/[-----+-----]/[----------------------------------------------------( )--  |
| |     0     |      113                                                        0  |
| | thru beam |                                                                    |
| |   I:1.0   |                                                                    |
| +----]/[----+                                                                    |
| |     1     |                                                                    |
| | thru beam |                                                                    |
| |   I:1.0   |                                                                    |
| +----]/[----+                                                                    |
| |     2     |                                                                    |
| | thru beam |                                                                    |
| |   I:1.0   |                                                                    |
| +----]/[----+                                                                    |
|       3                                                                          |

B3/0
                -] [-   2:41 2:54 2:58
                -]/[-   2:28 2:39
                -( )-   2:38

B3/113
                -] [-   2:35 2:51 2:52 2:53 2:88
                -]/[-   2:0 2:34 2:38 2:89
                -( )-   2:51

I:1.0/0
                -]/[-   2:38

I:1.0/1
                -]/[-   2:38

I:1.0/2
                -]/[-   2:38

I:1.0/3
                -]/[-   2:38
```

40

```
NEW                                                  March 17, 1995   Page 25
Program Listing          Processor File: 1234.ACH                     Rung 2:39

Rung 2:39
    MCR          |start          thru beams                        reduced
                 |cycle          ORed                              vac 2

I:1.0       I:1.0           B3        B3                      O:4.0
  -+----] [---------] [------+---]/[------]/[----------------------(  )-----
   |     13          14      |    0         122                       1
   | reduced                 |
   | vac 2                   |
   |  O:4.0                  |
   +----] [------------------+
         1
                osr reset
                air done
                   B3
   +---------------] [------+-+
                    4         |
   |        B3                |
   +---------------] [--------+
                   56

B3/0
            -] [-    2:41 2:54 2:58
            -]/[-    2:28 2:39
            -( )-    2:38

B3/4
            -] [-    2:39 2:40
            -( )-    2:63

B3/56
            -] [-    2:0 2:24 2:27 2:28 2:39 2:40 2:90
            -]/[-    2:51
            -( )-    2:26

B3/122
            -] [-    2:19
            -]/[-    2:24 2:28 2:34 2:35 2:39 2:40 2:41 2:44 2:45 2:47 2:49 2:51
                     2:58 2:61 2:64 2:70 2:71 2:72 2:74 2:75 2:77 2:78
            -( )-    2:16

I:1.0/13
            -] [-    2:12 2:16 2:19 2:22 2:26 2:27 2:37 2:39 2:40 2:93

I:1.0/14
            -] [-    2:12 2:14 2:26 2:39 2:40
            -]/[-    2:10

O:4.0/1
            -] [-    2:39
            -( )-    2:39
```

41

```
NEW                                                           March 17, 1995   Page 26
Program Listing         Processor File: 1234.ACH                              Rung 2:40

Rung 2:40
    MCR         |start          |delay btwn                              reduced
                |cycle          |pilot 1&2                               vac 1
      I:1.0        I:1.0          T4:8      B3                             O:4.0
  +----] [--------] [------+----]/[-------]/[---------------------------( )-----
  |      13           14   |      DN         122                            0
  | reduced                |
  | vac 1                  |
  | O:4.0                  |
  +----] [-----------------+
  |      0                 |
  |      osr reset         |
  |      air done          |
  |        B3              |
  +-+---------------] [----+-+
  |                  4       |
  |        B3                |
  +------------] [-----------+
                56

B3/4
            -] [-  2:39 2:40
            -( )-  2:63

B3/56
            -] [-  2:0 2:24 2:27 2:28 2:39 2:40 2:90
            -]/[-  2:51
            -( )-  2:26

B3/122
            -] [-  2:19
            -]/[-  2:24 2:28 2:34 2:35 2:39 2:40 2:41 2:44 2:45 2:47 2:49 2:51
                   2:58 2:61 2:64 2:70 2:71 2:72 2:74 2:75 2:77 2:78
            -( )-  2:16

I:1.0/13
            -] [-  2:12 2:16 2:19 2:22 2:26 2:27 2:37 2:39 2:40 2:93

I:1.0/14
            -] [-  2:12 2:14 2:26 2:39 2:40
            -]/[-  2:10

O:4.0/0
            -] [-  2:40
            -( )-  2:40

T4:8/DN
            -] [-  2:35 2:45
            -]/[-  2:40 2:44
```

42

```
NEW                                                      March 17, 1995    Page 27
Program Listing          Processor File: 1234.ACH                         Rung 2:41

Rung 2:41
|    thru beams|over skid |latched                            pilot vac2            |
|      ORed    |prx       |                                                         |
|       B3        I:1.0        B3          B3              +TON----------------+    |
|-+----] [--------] [---------] [------]/[-------------+---+TIMER ON DELAY  +-(EN)- |
| |     0          4           5         122              |Timer        T4:2+-(DN) |
| |                                                       |Time Base     0.01|     |
| |    pilot vac2                                         |Preset          25|     |
| |                                                       |Accum            0|     |
| |      T4:2                                             +------------------+     |
| +----] [-------------------------+                                                |
|        TT                                                                        |

B3/0
                 -] [-    2:41  2:54  2:58
                 -]/[-    2:28  2:39
                 -( )-    2:38

B3/5
                 -] [-    2:28  2:31  2:41
                 -( )-    2:28

B3/122
                 -] [-    2:19
                 -]/[-    2:24  2:28  2:34  2:35  2:39  2:40  2:41  2:44  2:45  2:47  2:49  2:51
                          2:58  2:61  2:64  2:70  2:71  2:72  2:74  2:75  2:77  2:78
                 -( )-    2:16

I:1.0/4
                 -] [-    2:18  2:25  2:26  2:32  2:34  2:41  2:86
                 -]/[-    2:16  2:61  3:1

T4:2
                 -TON-    2:41

T4:2/TT
                 -] [-    2:41  2:42

Rung 2:42
| pilot vac2|                                                              pilot vac2 |
|    T4:2                                                                     O:4.0   |
|----] [------------------------------------------------------------------------( )---|
|     TT                                                                        3     |

O:4.0/3
                 -( )-    2:42
```

43

```
NEW                                                    March 17, 1995   Page 28
Program Listing          Processor File: 1234.ACH                       Rung 2:43
    T4:2/TT
                -] [-  2:41 2:42

Rung 2:43
 | pilot vac2                                                        pilot vac2 |
 |                                                                       done   |
 |                                                                              |
 |      T4:2     B3                                                       B3    |
 |-----] [------[OSR]---------------------------------------------------( )-----|
 |      DN      100                                                       1     |

B3/1
                -] [-  2:49
                -( )-  2:43

B3/100
                -OSR-  2:43

T4:2/DN
                -] [-  2:43 2:44

Rung 2:44
 |    pilot vac2   delay btwn                                       delay btwn  |
 |                 pilot 1&2                                        pilot 1&2   |
 |       T4:2        T4:8       B3                    +TON--------------------+ |
 |-+----] [--------+-]/[-------]/[--------------------+TIMER ON DELAY   +-(EN)-|
 | |     DN        |  DN        122                   |Timer      T4:8+-(DN)  |
 | |               |                                  |Time Base  0.01|        |
 | |               |                                  |Preset       25|        |
 | |               |                                  |Accum         0|        |
 | |               |                                  +---------------+        |
 | | delay         |                                                           |
 | | pilot 1&2     |                                                           |
 | |    T4:8       |                                                           |
 | +----] [--------+                                                           |
 |       EN                                                                    |

B3/122
                -] [-   2:19
                -]/[-   2:24 2:28 2:34 2:35 2:39 2:40 2:41 2:44 2:45 2:47 2:49 2:51
                        2:58 2:61 2:64 2:70 2:71 2:72 2:74 2:75 2:77 2:78
                -( )-   2:16

T4:2/DN
                -] [-  2:43 2:44

T4:8
                -TON-  2:44

T4:8/DN
                -] [-  2:35 2:45
                -]/[-  2:40 2:44
```

44

```
NEW                                                      March 17, 1995   Page 29
Program Listing          Processor File: 1234.ACH                         Rung 2:45
T4:8/EN
            -] [-  2:44
```
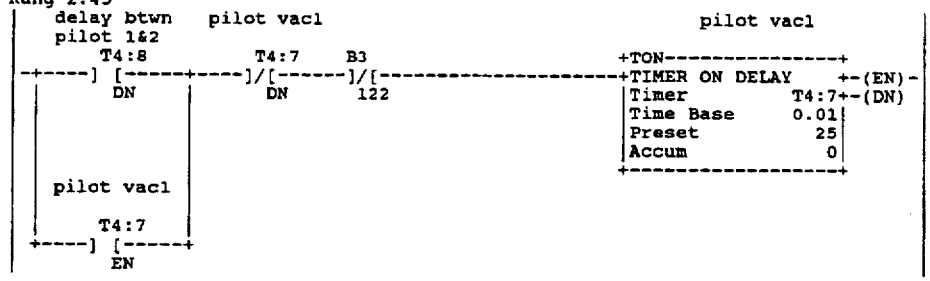
```
B3/122
            -] [-  2:19
            -]/[-  2:24 2:28 2:34 2:35 2:39 2:40 2:41 2:44 2:45 2:47 2:49 2:51
                   2:58 2:61 2:64 2:70 2:71 2:72 2:74 2:75 2:77 2:78
            -( )-  2:16
T4:7
            -TON-  2:45
T4:7/DN
            -] [-  2:47
            -]/[-  2:45
T4:7/EN
            -] [-  2:45
T4:8/DN
            -] [-  2:35 2:45
            -]/[-  2:40 2:44
```
```
O:3.0/3
            -( )-  2:46
T4:7/TT
            -] [-  2:46
```
45

```
NEW                                             March 17, 1995   Page 30
Program Listing       Processor File: 1234.ACH                   Rung 2:47

Rung 2:47
     pilot vac1   rst air2                                   LIFT VAC
       T4:7        O:4.0       B3                               B3
  +----] [-----+----]/[-------]/[----------------------------( )-----|
  |     DN     |     2         122                               22
  |  LIFT VAC  |
  |     B3     |
  +----] [-----+
        22

B3/22
              -] [-   2:47
              -]/[-   2:48
              -( )-   2:47

B3/122
              -] [-   2:19
              -]/[-   2:24 2:28 2:34 2:35 2:39 2:40 2:41 2:44 2:45 2:47 2:49 2:51
                     2:58 2:61 2:64 2:70 2:71 2:72 2:74 2:75 2:77 2:78
              -( )-   2:16

O:4.0/2
              -] [-   2:57
              -]/[-   2:47 2:63
              -( )-   2:56

T4:7/DN
              -] [-   2:47
              -]/[-   2:45

Rung 2:48
  LIFT VAC                                                     lift vac2
     B3                                                          O:4.0
  |----]/[-------------------------------------------------+----( )----+-|
       22                                                  |     4     |
                                                           |  lift vac1|
                                                           |    O:3.0  |
                                                           +----( )----+
                                                                 4

B3/22
              -] [-   2:47
              -]/[-   2:48
              -( )-   2:47

O:3.0/4
              -( )-   2:48

O:4.0/4
              -( )-   2:48
```

46

```
NEW                                                      March 17, 1995   Page 31
Program Listing          Processor File: 1234.ACH                         Rung 2:49
```
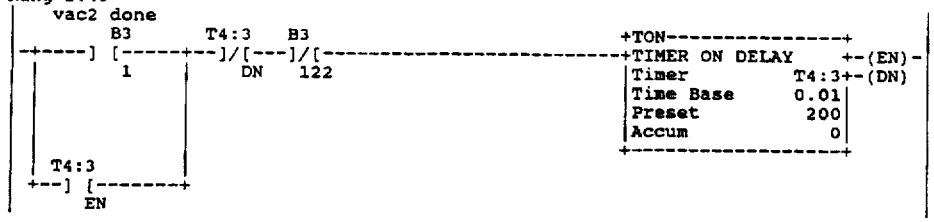
```
B3/1
            -] [-    2:49
            -( )-    2:43
B3/122
            -] [-    2:19
            -]/[-    2:24 2:28 2:34 2:35 2:39 2:40 2:41 2:44 2:45 2:47 2:49 2:51
                     2:58 2:61 2:64 2:70 2:71 2:72 2:74 2:75 2:77 2:78
            -( )-    2:16
T4:3
            -TON-    2:49
T4:3/DN
            -]/[-    2:49
T4:3/EN
            -] [-    2:49
```
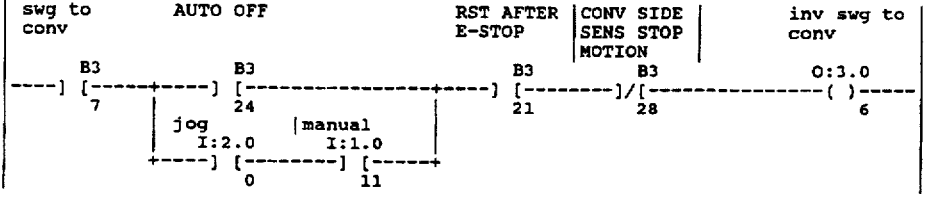
```
B3/7
            -] [-    2:33 2:34 2:50
            -( )-    2:34
B3/21
            -] [-    2:0 2:12 2:23 2:30 2:31 2:37 2:50 2:62 2:92
            -( )-    2:12
```

```
NEW                                                    March 17, 1995   Page 32
Program Listing         Processor File: 1234.ACH                        Rung 2:51
    B3/24
                -] [-   2:14 2:31 2:37 2:50 2:62
                -( )-   2:14

B3/28
                -] [-   2:10
                -]/[-   2:31 2:50
                -( )-   2:10

I:1.0/11
                -] [-   2:13 2:31 2:37 2:37 2:50 2:62
                -]/[-   2:9 2:14 2:16

I:2.0/0
                -] [-   2:9 2:12 2:14 2:26 2:31 2:37 2:50 2:62

O:3.0/6
                -( )-   2:50

Rung 2:51
|     LOW LIMIT       START OF
|                     MAN/JOG
|                     AUTO START
|
|        B3            B3       B3                                              B3
|-+----] [-----+-----]/[------]/[--------------------------------------------( )--
| |    255           56       122                                              113
| |  latched
| |  skid done
| |    B3
| +----] [-----+
|      113

B3/56
                -] [-   2:0 2:24 2:27 2:28 2:39 2:40 2:90
                -]/[-   2:51
                -( )-   2:26

B3/113
                -] [-   2:35 2:51 2:52 2:53 2:88
                -]/[-   2:0 2:34 2:38 2:89
                -( )-   2:51

B3/122
                -] [-   2:19
                -]/[-   2:24 2:28 2:34 2:35 2:39 2:40 2:41 2:44 2:45 2:47 2:49 2:51
                        2:58 2:61 2:64 2:70 2:71 2:72 2:74 2:75 2:77 2:78
                -( )-   2:16

B3/255
                -] [-   2:51
                -]/[-   2:28
                -( )-   2:87
```

48

```
NEW                                              March 17, 1995   Page 33
Program Listing          Processor File: 1234.ACH                Rung 2:52

Rung 2:52
 | latched
 | skid done
 |    B3         B3                                                     B3       |
 |----] [------[OSR]----------------------------------------------------( )--    |
 |     113       114                                                     115     |

B3/113
              -] [-   2:35 2:51 2:52 2:53 2:88
              -]/[-   2:0  2:34 2:38 2:89
              -( )-   2:51

B3/114
              -OSR-   2:52

B3/115
              -] [-   2:35
              -( )-   2:52

Rung 2:53
 | latched   |flash bit
 | skid done |
 |    B3        S:4                                                    O:3.0     |
 |----] [-------] [-----------------------------------------------------( )--    |
 |    113        4                                                      11       |

B3/113
              -] [-   2:35 2:51 2:52 2:53 2:88
              -]/[-   2:0  2:34 2:38 2:89
              -( )-   2:51

O:3.0/11
              -( )-   2:53

S:4/4
              -] [-   2:53

Rung 2:54
 | thru beams|over conv
 |  ORed     |latched
 |    B3         B3                                                     B3       |
 |----] [--------] [----------------------------------------------------( )--    |
 |     0         112                                                    20       |

B3/0
              -] [-   2:41 2:54 2:58
              -]/[-   2:28 2:39
              -( )-   2:38
```

49

```
NEW                                                      March 17, 1995    Page 34
Program Listing        Processor File: 1234.ACH                            Rung 2:55
   B3/20
                -] [-  2:55 2:56
                -( )-  2:54

B3/112
                -] [-  2:54 2:58 2:60 2:70
                -( )-  2:70

Rung 2:55
  | thru beams                                                    reset air         |
  | & over con                                                    off               |
  |                                                                                 |
  |      B3                                            +TOF----------------+        |
  |----] [--------------------------------------------+TIMER OFF DELAY  +-(EN)-     |
  |     20                                            |Timer      T4:10+-(DN)      |
  |                                                   |Time Base    0.01|           |
  |                                                   |Preset        150|           |
  |                                                   |Accum         150|           |
  |                                                   +-----------------+           |

B3/20
                -] [-  2:55 2:56
                -( )-  2:54

T4:10
                -TOF-  2:55

Rung 2:56
  |  thru beams                                                                     |
  |  & over con                                                     rsr air2        |
  |                                                                                 |
  |        B3                                                        O:4.0          |
  |-+----] [----+---------------------------------------------+-----( )-----+-      |
  | |     20   |                                              |       2     |       |
  | | reset air|                                              |             |       |
  | | off      |                                              |  rst air 1  |       |
  | |  T4:10   |                                              |    O:3.0    |       |
  | +----] [---+                                              +-----( )-----+       |
  |        TT                                                        2              |

B3/20
                -] [-  2:55 2:56
                -( )-  2:54

O:3.0/2
                -( )-  2:56

O:4.0/2
                -] [-  2:57
                -]/[-  2:47 2:63
                -( )-  2:56
```

```
NEW                                              March 17, 1995   Page 35
Program Listing       Processor File: 1234.ACH                   Rung 2:57

T4:10/TT
              -] [-  2:56

Rung 2:57
 | reset air2
 |
 |   O:4.0       B3                                                      B3  |
 |----] [------[OSR]------------------------------------------------( )--|
 |     2         90                                                      71 |

B3/71
              -] [-  2:71 2:72 2:74 2:75 2:77 2:78
              -( )-  2:57

B3/90
              -OSR-  2:57

O:4.0/2
              -] [-  2:57
              -]/[-  2:47 2:63
              -( )-  2:56

Rung 2:58
 |   thru beams|over conv |TI1 at     end up                       #2 acc/dec |
 |    ORed     |latched   |speed      over conv                               |
 |     B3          B3       I:2.0       B3         B3                 O:4.0   |
 |-+----] [--------] [--------]/[----+----]/[------]/[----------------( )-----|
 | |    0          112          8    |    3        122                  6     |
 | | #2 acc/dec                      |                                        |
 | |                                 |                                        |
 | |   O:4.0                         |                                        |
 | +----] [-------------------------+                                         |
 |      6                                                                     |

B3/0
              -] [-  2:41 2:54 2:58
              -]/[-  2:28 2:39
              -( )-  2:38

B3/3
              -] [-  2:61 2:64
              -]/[-  2:35 2:58 2:70
              -( )-  2:60

B3/112
              -] [-  2:54 2:58 2:60 2:70
              -( )-  2:70
```

51

```
NEW                                              March 17, 1995   Page 36
Program Listing        Processor File: 1234.ACH                   Rung 2:59
B3/122
            -] [-  2:19
            -]/[-  2:24 2:28 2:34 2:35 2:39 2:40 2:41 2:44 2:45 2:47 2:49 2:51
                   2:58 2:61 2:64 2:70 2:71 2:72 2:74 2:75 2:77 2:78
            -( )-  2:16
I:2.0/8
            -] [-  2:2
            -]/[-  2:58
O:4.0/6
            -] [-  2:58
            -( )-  2:58
Rung 2:59
NOT I;1/10 AND I;1/12 EQUALS UPPER LIMIT
```
```
B3/93
            -OSR-  2:59
B3/94
            -] [-  2:60
            -]/[-  2:78
            -( )-  2:59
I:1.0/10
            -] [-  2:35 2:37 2:72 2:75 2:87
            -]/[-  2:15 2:32 2:59 2:74 2:76 2:77 2:88
I:1.0/12
            -] [-  2:15 2:32 2:59 2:86 2:87 2:88
            -]/[-  2:35 2:37
```
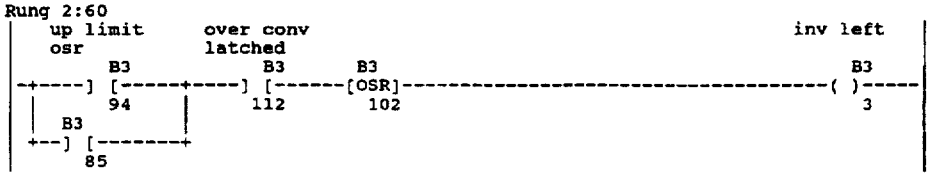

```
NEW                                                      March 17, 1995   Page 37
Program Listing          Processor File: 1234.ACH                        Rung 2:61

B3/3
            -] [-  2:61 2:64
            -]/[-  2:35 2:58 2:70
            -( )-  2:60

B3/85
            -] [-  2:60 2:85
            -]/[-  2:35
            -( )-  2:84

B3/94
            -] [-  2:60
            -]/[-  2:78
            -( )-  2:59

B3/102
            -OSR-  2:60

B3/112
            -] [-  2:54 2:58 2:60 2:70
            -( )-  2:70

Rung 2:61
               head over
               skid
    B3         I:1.0      B3                                              B3
 -+--] [--+----]/[------]/[---------------------------------------------( )--|
  |    3  |      4         122                                            8
  |  B3   |
  +--] [--+
       8

B3/3
            -] [-  2:61 2:64
            -]/[-  2:35 2:58 2:70
            -( )-  2:60

B3/8
            -] [-  2:61 2:62
            -( )-  2:61

B3/122
            -] [-  2:19
            -]/[-  2:24 2:28 2:34 2:35 2:39 2:40 2:41 2:44 2:45 2:47 2:49 2:51
                   2:58 2:61 2:64 2:70 2:71 2:72 2:74 2:75 2:77 2:78
            -( )-  2:16

I:1.0/4
            -] [-  2:18 2:25 2:26 2:32 2:34 2:41 2:86
            -]/[-  2:16 2:61 3:1
```

```
NEW                                                    March 17, 1995   Page 38
Program Listing        Processor File: 1234.ACH                         Rung 2:62

Rung 2:62
          AUTO OFF                    RST AFTER                         TI2 rotate
                                      E-STOP                            to skid
     B3              B3               B3                                O:3.0
  --] [--+----] [-----------------+----] [------------------------------( )-----
      8  |     24                 |     21                                 7
         |  jog       |manual     |
         |  I:2.0     I:1.0       |
         +----] [---------] [-----+
              0            11

B3/8
              -] [-   2:61 2:62
              -( )-   2:61

B3/21
              -] [-   2:0 2:12 2:23 2:30 2:31 2:37 2:50 2:62 2:92
              -( )-   2:12

B3/24
              -] [-   2:14 2:31 2:37 2:50 2:62
              -( )-   2:14

I:1.0/11
              -] [-   2:13 2:31 2:37 2:37 2:50 2:62
              -]/[-   2:9 2:14 2:16

I:2.0/0
              -] [-   2:9 2:12 2:14 2:26 2:31 2:37 2:50 2:62

O:3.0/7
              -]/[-   2:17
              -( )-   2:62 3:1

Rung 2:63
   rst air2
     O:4.0         B3                                                       B3
  |----]/[-------[OSR]----------------------------------------------------( )--|
      2          103                                                        4

B3/4
              -] [-   2:39 2:40
              -( )-   2:63

B3/103
              -OSR-   2:63

O:4.0/2
              -] [-   2:57
              -]/[-   2:47 2:63
              -( )-   2:56
```

```
NEW                                                    March 17, 1995   Page 39
Program Listing          Processor File: 1234.ACH                       Rung 2:64
Rung 2:64
   start rht
   swing
         B3                      T4:4    B3              +TON---------------+
  -+----] [-------------+--]/[---]/[------------------+TIMER ON DELAY   +-(EN)-
   |     111            |   DN    122                 |Timer         T4:4+-(DN)
   |                    |                             |Time Base     0.01|
   |          B3        |                             |Preset         193|
  +-+----------] [--+-+                               |Accum            0|
   |              3 |                                 +------------------+
   |        T4:4    |
   +----------] [--+
                EN
```
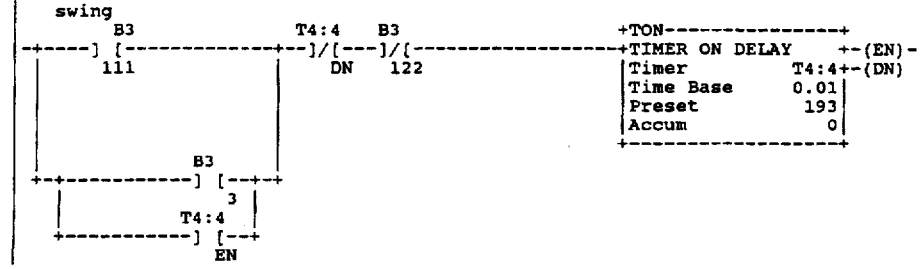
```
B3/3
            -] [-  2:61 2:64
            -]/[-  2:35 2:58 2:70
            -( )-  2:60
B3/111
            -] [-  2:34 2:64
            -]/[-  2:35
            -( )-  2:32
B3/122
            -] [-  2:19
            -]/[-  2:24 2:28 2:34 2:35 2:39 2:40 2:41 2:44 2:45 2:47 2:49 2:51
                   2:58 2:61 2:64 2:70 2:71 2:72 2:74 2:75 2:77 2:78
            -( )-  2:16
T4:4
            -TON-  2:64
T4:4/DN
            -]/[-  2:64
T4:4/EN
            -] [-  2:64
Rung 2:65
                                                                  TI2 speed
   T4:4                                                             O:4.0
  --] [-------------------------------------------------------------( )-----
     TT                                                               8
```
```
O:4.0/8
            -]/[-  2:66
            -( )-  2:65
```

```
NEW                                                        March 17, 1995   Page 40
Program Listing        Processor File: 1234.ACH                             Rung 2:66
         T4:4/TT
                  -] [-  2:65

Rung 2:66
  | TI2 SPEED |                                                        TI2 SPEED |
  |   O:4.0   |                                                          O:4.0   |
  |----]/[--------------------------------------------------------------( )------|
         8                                                                 7

O:4.0/7
                  -( )-   2:66

O:4.0/8
                  -]/[-   2:66
                  -( )-   2:65

Rung 2:67
  | CENTER AB  | MAN UP   | AB SENSOR                           CENTER AB        |
  | SENSOR     |          | MIN HEIGHT                          SENSOR           |
  |                                                                              |
  |   I:2.0      I:2.0        B3                        +TON----------------+    |
  |----]/[--------]/[---------]/[------------------------+TIMER ON DELAY +-(EN)-  |
         4          1          200                      |Timer       T4:5+-(DN)  |
  |                                                     |Time Base   0.01|       |
  |                                                     |Preset        50|       |
  |                                                     |Accum          0|       |
  |                                                     +----------------+       |

B3/200
                  -]/[-   2:67  2:68  2:69
                  -( )-   2:86

I:2.0/1
                  -] [-   2:12  2:16  2:37
                  -]/[-   2:67  2:68  2:69

I:2.0/4
                  -]/[-   2:67

T4:5
                  -TON-   2:67
```

56

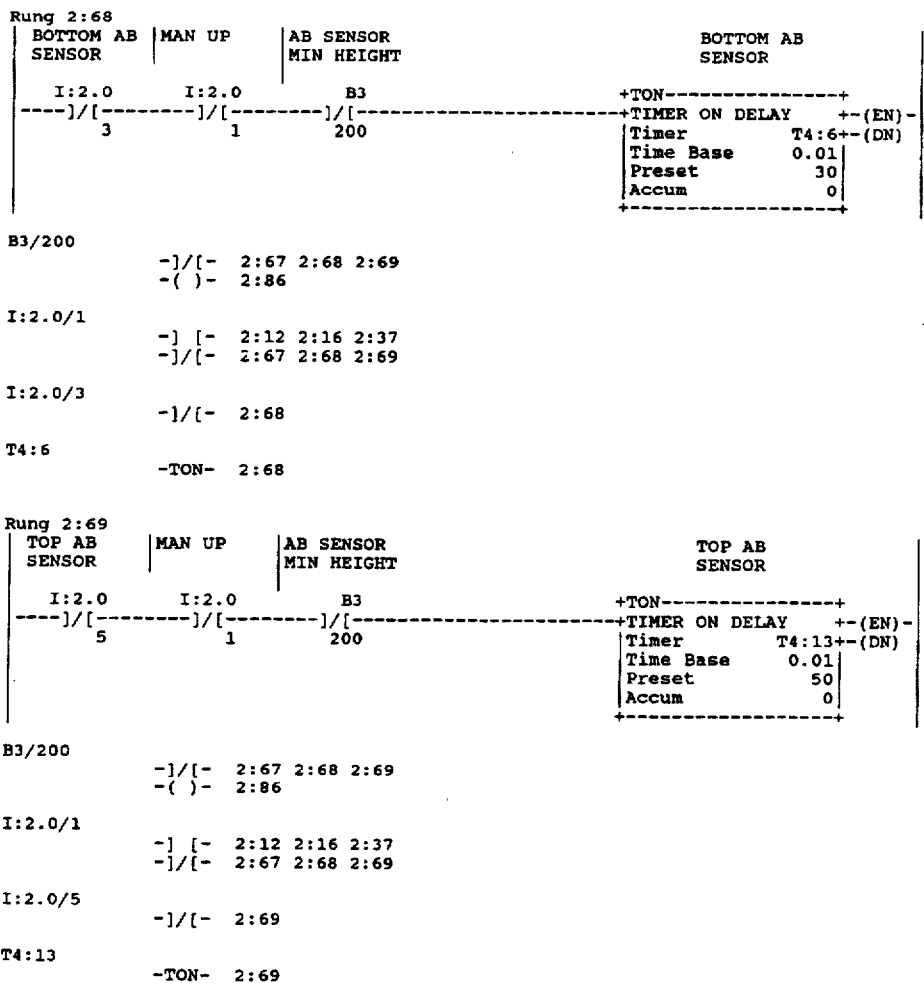

```
NEW                                                  March 17, 1995  Page 42
Program Listing          Processor File: 1234.ACH                    Rung 2:70
Rung 2:70
|    end rht.      end up                                          OVER CONV
|    swing osr    over conv                                        LATCHED
|       B3           B3       B3                                      B3
|-+----] [-----+----]/[------]/[----------------------------------( )----|
| |     2     |     3       122                                      112
| | over conv |
| | latched   |
| |    B3     |
| +----] [----+
|       112

B3/2
              -] [-   2:28 2:70
              -( )-   2:33

B3/3
              -] [-   2:61 2:64
              -]/[-   2:35 2:58 2:70
              -( )-   2:60

B3/112
              -] [-   2:54 2:58 2:60 2:70
              -( )-   2:70

B3/122
              -] [-   2:19
              -]/[-   2:24 2:28 2:34 2:35 2:39 2:40 2:41 2:44 2:45 2:47 2:49 2:51
                     2:58 2:61 2:64 2:70 2:71 2:72 2:74 2:75 2:77 2:78
              -( )-   2:16

Rung 2:71
|   START UP  |BOTTOM AB |CENTER AB    DISTANCE                               |
|             |SENSOR    |SENSOR       UP                                     |
|     B3         T4:6       T4:5         C5:0      B3                      B3 |
|-+----] [--------] [--------] [-----+----]/[------]/[--------------------( )--|
| |    71         DN          DN    |    DN       122                     72 |
| |   B3                             |
| +--] [------------------------------+
|     72

B3/71
              -] [-   2:71 2:72 2:74 2:75 2:77 2:78
              -( )-   2:57

B3/72
              -] [-   2:71 2:79 2:82
              -( )-   2:71
```

58

```
NEW                                                    March 17, 1995   Page 43
Program Listing          Processor File: 1234.ACH                       Rung 2:72

B3/122
            -] [-  2:19
            -]/[-  2:24 2:28 2:34 2:35 2:39 2:40 2:41 2:44 2:45 2:47 2:49 2:51
                   2:58 2:61 2:64 2:70 2:71 2:72 2:74 2:75 2:77 2:78
            -( )-  2:16

C5:0/DN
            -]/[-  2:71 2:74 2:77

T4:5/DN
            -] [-  2:32 2:71 2:72 2:74
            -]/[-  2:75 2:77 2:78

T4:6/DN
            -] [-  2:32 2:71 2:78
            -]/[-  2:72 2:74 2:75 2:77

Rung 2:72
    START UP   |BOTTOM AB  |CENTER AB  |ref prox  |low limit
               |SENSOR     |SENSOR     |          |
       B3          T4:6        T4:5       I:1.0      I:1.0       B3       B3        >
   -+----] [---------]/[---------] [---------] [---------]/[-----+-]/[---]/[-------->
    |     71         DN          DN          10          8       |   75      122    >
    |   B3                                                       |
    +--] [---------------------------------------------------+
          73

<   B3
                                                                              <--( )--|
                                                                              <   73

B3/71
            -] [-  2:71 2:72 2:74 2:75 2:77 2:78
            -( )-  2:57

B3/73
            -] [-  2:72 2:82
            -( )-  2:72

B3/75
            -]/[-  2:72
            -( )-  2:73
```

59

```
NEW                                                    March 17, 1995   Page 44
Program Listing        Processor File: 1234.ACH                         Rung 2:73
       B3/122
                  -] [-  2:19
                  -]/[-  2:24 2:28 2:34 2:35 2:39 2:40 2:41 2:44 2:45 2:47 2:49 2:51
                         2:58 2:61 2:64 2:70 2:71 2:72 2:74 2:75 2:77 2:78
                  -( )-  2:16
       I:1.0/8
                  -] [-  2:73 2:74 2:87
                  -]/[-  2:72
       I:1.0/10
                  -] [-  2:35 2:37 2:72 2:75 2:87
                  -]/[-  2:15 2:32 2:59 2:74 2:76 2:77 2:88
       T4:5/DN
                  -] [-  2:32 2:71 2:72 2:74
                  -]/[-  2:75 2:77 2:78
       T4:6/DN
                  -] [-  2:32 2:71 2:78
                  -]/[-  2:72 2:74 2:75 2:77
Rung 2:73
|  low limit
|    I:1.0         B3                                                         B3  |
|----] [--------[OSR]-------------------------------------------------------( )-- |
|      8         74                                                           75  |
       B3/74
                  -OSR-  2:73
       B3/75
                  -]/[-  2:72
                  -( )-  2:73
       I:1.0/8
                  -] [-  2:73 2:74 2:87
                  -]/[-  2:72
```
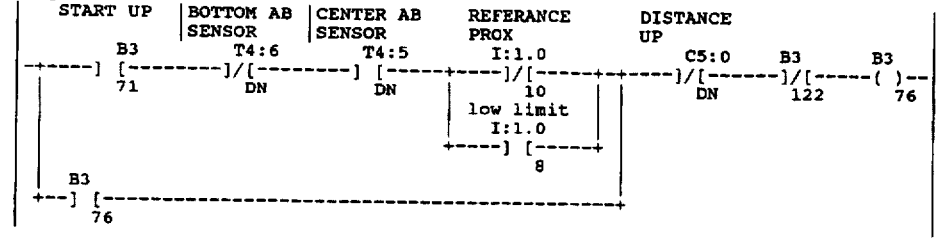

```
NEW                                                      March 17, 1995   Page 45
Program Listing         Processor File: 1234.ACH                          Rung 2:75

B3/71
           -] [-   2:71 2:72 2:74 2:75 2:77 2:78
           -( )-   2:57

B3/76
           -] [-   2:74 2:79 2:82
           -( )-   2:74

B3/122
           -] [-   2:19
           -]/[-   2:24 2:28 2:34 2:35 2:39 2:40 2:41 2:44 2:45 2:47 2:49 2:51
                   2:58 2:61 2:64 2:70 2:71 2:72 2:74 2:75 2:77 2:78
           -( )-   2:16

C5:0/DN
           -]/[-   2:71 2:74 2:77

I:1.0/8
           -] [-   2:73 2:74 2:87
           -]/[-   2:72

I:1.0/10
           -] [-   2:35 2:37 2:72 2:75 2:87
           -]/[-   2:15 2:32 2:59 2:74 2:76 2:77 2:88

T4:5/DN
           -] [-   2:32 2:71 2:72 2:74
           -]/[-   2:75 2:77 2:78

T4:6/DN
           -] [-   2:32 2:71 2:78
           -]/[-   2:72 2:74 2:75 2:77

Rung 2:75
|    START UP |BOTTOM AB |CENTER AB |ref prox                                        |
|             |SENSOR    |SENSOR    |                                                 |
|       B3       T4:6        T4:5       I:1.0       B3       B3                  B3  |
|-+----] [--------]/[--------]/[---------] [-----+-]/[---]/[----------------( )--   |
| |    71         DN          DN          10     |  79     122                  77  |
| |  B3                                          |                                  |
| +--] [------------------------------------------+                                  |
|     77                                                                             |

B3/71
           -] [-   2:71 2:72 2:74 2:75 2:77 2:78
           -( )-   2:57

B3/77
           -] [-   2:75 2:82
           -( )-   2:75
```

```
NEW                                              March 17, 1995   Page 46
Program Listing      Processor File: 1234.ACH                     Rung 2:76

B3/79
              -]/[-  2:75
              -( )-  2:76

B3/122
              -] [-  2:19
              -]/[-  2:24 2:28 2:34 2:35 2:39 2:40 2:41 2:44 2:45 2:47 2:49 2:51
                     2:58 2:61 2:64 2:70 2:71 2:72 2:74 2:75 2:77 2:78
              -( )-  2:16

I:1.0/10
              -] [-  2:35 2:37 2:72 2:75 2:87
              -]/[-  2:15 2:32 2:59 2:74 2:76 2:77 2:88

T4:5/DN
              -] [-  2:32 2:71 2:72 2:74
              -]/[-  2:75 2:77 2:78

T4:6/DN
              -] [-  2:32 2:71 2:78
              -]/[-  2:72 2:74 2:75 2:77

Rung 2:76
 | REFERANCE
 | PROX
 |   I:1.0        B3                                                      B3    |
 |----]/[--------[OSR]----------------------------------------------------( )-- |
 |     10          78                                                      79   |

B3/78
              -OSR-  2:76

B3/79
              -]/[-  2:75
              -( )-  2:76

I:1.0/10
              -] [-  2:35 2:37 2:72 2:75 2:87
              -]/[-  2:15 2:32 2:59 2:74 2:76 2:77 2:88

Rung 2:77
 |   START UP  |BOTTOM AB |CENTER AB |REFERANCE  DISTANCE                         |
 |             |SENSOR    |SENSOR    |PROX       UP                               |
 |      B3         T4:6       T4:5      I:1.0        C5:0      B3          B3     |
 |-+----] [-------]/[--------]/[-------]/[-----+----]/[-------]/[---------( )--   |
 | |    71         DN         DN        10    |     DN        122         80     |
 | |  B3                                      |                                   |
 | +--] [--------------------------------------+                                  |
 |     80                                                                         |
```

```
NEW                                                      March 17, 1995   Page 47
Program Listing           Processor File: 1234.ACH                        Rung 2:78
    B3/71
              -] [-   2:71 2:72 2:74 2:75 2:77 2:78
              -( )-   2:57
    B3/80
              -] [-   2:77 2:79 2:82
              -( )-   2:77
    B3/122
              -] [-   2:19
              -]/[-   2:24 2:28 2:34 2:35 2:39 2:40 2:41 2:44 2:45 2:47 2:49 2:51
                      2:58 2:61 2:64 2:70 2:71 2:72 2:74 2:75 2:77 2:78
              -( )-   2:16
    C5:0/DN
              -]/[-   2:71 2:74 2:77
    I:1.0/10
              -] [-   2:35 2:37 2:72 2:75 2:87
              -]/[-   2:15 2:32 2:59 2:74 2:76 2:77 2:88
    T4:5/DN
              -] [-   2:32 2:71 2:72 2:74
              -]/[-   2:75 2:77 2:78
    T4:6/DN
              -] [-   2:32 2:71 2:78
              -]/[-   2:72 2:74 2:75 2:77
```
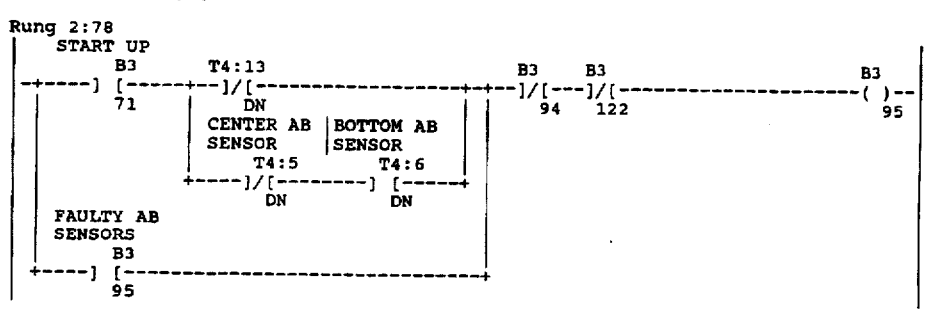
```
    B3/71
              -] [-   2:71 2:72 2:74 2:75 2:77 2:78
              -( )-   2:57
    B3/94
              -] [-   2:60
              -]/[-   2:78
              -( )-   2:59
```

```
NEW                                                     March 17, 1995   Page 48
Program Listing          Processor File: 1234.ACH                        Rung 2:79
      B3/95
              -] [-  2:2  2:78 2:82
              -( )-  2:78

B3/122
              -] [-  2:19
              -]/[-  2:24 2:28 2:34 2:35 2:39 2:40 2:41 2:44 2:45 2:47 2:49 2:51
                     2:58 2:61 2:64 2:70 2:71 2:72 2:74 2:75 2:77 2:78
              -( )-  2:16

T4:5/DN
              -] [-  2:32 2:71 2:72 2:74
              -]/[-  2:75 2:77 2:78

T4:6/DN
              -] [-  2:32 2:71 2:78
              -]/[-  2:72 2:74 2:75 2:77

T4:13/DN
              -] [-  2:32
              -]/[-  2:78

Rung 2:79
       B3                                                                       B3
    -+--] [--+---------------------------------------------------------------( )--
     |  72   |                                                                  81
     |  B3   |
     +--] [--+
     |  80   |
     |  B3   |
     +--] [--+
        76

B3/72
              -] [-  2:71 2:79 2:82
              -( )-  2:71

B3/76
              -] [-  2:74 2:79 2:82
              -( )-  2:74

B3/80
              -] [-  2:77 2:79 2:82
              -( )-  2:77

B3/81
              -] [-  2:80
              -( )-  2:79
```

```
NEW                                                     March 17, 1995   Page 49
Program Listing         Processor File: 1234.ACH                         Rung 2:80
Rung 2:80
|       SAFETY
|       LATCH
|       COUNTER
|       PROX
|   B3      I:2.0                                       +TON---------------+
|--] [-----] [------------------------------------------+TIMER ON DELAY  +-(EN)-
|   81       7                                          |Timer     T4:12+-(DN)
|                                                       |Time Base   0.01|
|                                                       |Preset         2|
|                                                       |Accum          0|
|                                                       +----------------+

B3/81
                -] [-  2:80
                -( )-  2:79

I:2.0/7
                -] [-  2:3  2:80

T4:12
                -TON-  2:80

Rung 2:81
|  COUNT                                                       UP TRAVEL
|                                                              COUNTER
|   T4:12                                               +CTU---------------+
|----] [------------------------------------------------+COUNT UP        +-(CU)-
|      DN                                               |Counter    C5:0+-(DN)
|                                                       |Preset         8|
|                                                       |Accum          0|
|                                                       +----------------+

C5:0
                -CTU-  2:81
                -RES-  2:85

T4:12/DN
                -] [-  2:81

Rung 2:82
|      B3                                                                    B3
|-+--] [--------+-------------------------------------------------------------( )--
| |    72       |                                                             91
| |   B3        |
| +--] [--------+
| |    73       |
| +++          +++
```

```
NEW                                                          March 17, 1995   Page 50
Program Listing        Processor File: 1234.ACH                               Rung 2:82
```
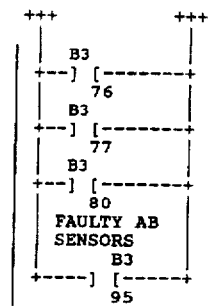
```
B3/72
              -] [-  2:71 2:79 2:82
              -( )-  2:71
B3/73
              -] [-  2:72 2:82
              -( )-  2:72
B3/76
              -] [-  2:74 2:79 2:82
              -( )-  2:74
B3/77
              -] [-  2:75 2:82
              -( )-  2:75
B3/80
              -] [-  2:77 2:79 2:82
              -( )-  2:77
B3/91
              -] [-  2:83
              -]/[-  2:84
              -( )-  2:82
B3/95
              -] [-  2:2 2:78 2:82
              -( )-  2:78
```

```
NEW                                                        March 17, 1995   Page 51
Program Listing           Processor File: 1234.ACH                          Rung 2:84
  B3/82
            -OSR-   2:83
  B3/83
            -] [-   2:35
            -( )-   2:83
  B3/91
            -] [-   2:83
            -]/[-   2:84
            -( )-   2:82

Rung 2:84
                                                                   UP MOTION
                                                                   DONE
    B3     B3                                                       B3
 --]/[---[OSR]-----------------------------------------------------( )----
    91     84                                                       85

B3/84
            -OSR-   2:84
  B3/85
            -] [-   2:60  2:85
            -]/[-   2:35
            -( )-   2:84
  B3/91
            -] [-   2:83
            -]/[-   2:84
            -( )-   2:82

Rung 2:85
    B3                                                              C5:0
 --] [-------------------------------------------------------------(RES)--
    85

B3/85
            -] [-   2:60  2:85
            -]/[-   2:35
            -( )-   2:84
  C5:0
            -CTU-   2:81
            -RES-   2:85
```

```
NEW                                                    March 17, 1995    Page 52
Program Listing          Processor File: 1234.ACH                         Rung 2:86
Rung 2:86
DISABLE AB SENSORS WHEN COMING DOWN AND BACK UP TO MIN HEIGHT OVER SKID
 | over skid |up limit |                                                AB SENSOR  |
 |   prx     |         |                                                REF HEIGHT |
 |   I:1.0       I:1.0                                                       B3    |
 |----] [--------] [---------------------------------------------------------( )---|
 |      4         12                                                         200   |

B3/200
            -]/[-  2:67 2:68 2:69
            -( )-  2:86

I:1.0/4
            -] [-  2:18 2:25 2:26 2:32 2:34 2:41 2:86
            -]/[-  2:16 2:61 3:1

I:1.0/12
            -] [-  2:15 2:32 2:59 2:86 2:87 2:88
            -]/[-  2:35 2:37

Rung 2:87
3 PROX ANDed TOGETHER EQUALS LOW LIMIT
 | ref prox  |low limit |up limit  |                                               |
 |   I:1.0       I:1.0      I:1.0                                         LOW LIMIT |
 |                                                                            B3    |
 |----] [--------] [--------] [-----------------------------------------------( )---|
 |     10         8          12                                               255   |

B3/255
            -] [-  2:51
            -]/[-  2:28
            -( )-  2:87

I:1.0/8
            -] [-  2:73 2:74 2:87
            -]/[-  2:72

I:1.0/10
            -] [-  2:35 2:37 2:72 2:75 2:87
            -]/[-  2:15 2:32 2:59 2:74 2:76 2:77 2:88

I:1.0/12
            -] [-  2:15 2:32 2:59 2:86 2:87 2:88
            -]/[-  2:35 2:37
```

```
NEW                                                      March 17, 1995   Page 53
Program Listing          Processor File: 1234.ACH                         Rung 2:88

Rung 2:88
WHEN PALLET IS DONE AND UPPER LIMIT REACHED UNLATHES BIT THAT DISABLES RESTART
 | latched     |up limit  |REFERANCE                                              |
 | skid done   |          |PROX                                                   |
 |   B3          I:1.0      I:1.0       B3                                     B3 |
 |----] [--------] [--------]/[------[OSR]---------------------------------( )--   |
 |    113          12         10       201                                     202|

B3/113
            -] [-  2:35 2:51 2:52 2:53 2:88
            -]/[-  2:0 2:34 2:38 2:89
            -( )-  2:51

B3/201
            -OSR-  2:88

B3/202
            -]/[-  2:24
            -( )-  2:88

I:1.0/10
            -] [-  2:35 2:37 2:72 2:75 2:87
            -]/[-  2:15 2:32 2:59 2:74 2:76 2:77 2:88

I:1.0/12
            -] [-  2:15 2:32 2:59 2:86 2:87 2:88
            -]/[-  2:35 2:37

Rung 2:89
 | END CONV    |SEL SW    |latched                                                |
 | SENSOR      |ON/OFF MAT|skid done                                              |
 |                                              +TON----------------+             |
 |   I:1.0       I:1.0       B3                 +TIMER ON DELAY  +-(EN)-|         |
 |----] [--------] [--------]/[-----------------+Timer     T4:9+-(DN)   |         |
 |     5           15         113               |Time Base    1.0|               |
 |                                              |Preset         4|               |
 |                                              |Accum          0|               |
 |                                              +----------------+               |

B3/113
            -] [-  2:35 2:51 2:52 2:53 2:88
            -]/[-  2:0 2:34 2:38 2:89
            -( )-  2:51

I:1.0/5
            -] [-  2:89

I:1.0/15
            -] [-  2:0 2:89
```

```
NEW                                                       March 17, 1995   Page 54
Program Listing        Processor File: 1234.ACH                            Rung 2:90

T4:9
            -TON-   2:89

Rung 2:90
                  DEBOUNCE
                  TIMER
        B3        T4:14                                                         B3
  -+--] [--+----]/[---------------------------------------------------------( )--
   |   56  |     DN                                                             30
   |   B3  |
   +--] [--+
       30

B3/30
               -] [-   2:90 2:92
               -( )-   2:90

B3/56
               -] [-   2:0 2:24 2:27 2:28 2:39 2:40 2:90
               -]/[-   2:51
               -( )-   2:26

T4:14/DN
               -] [-   2:91
               -]/[-   2:90

Rung 2:91
  | DEBOUNCE  |
  | TIMER     |                                                       DEBOUNCE
  |  T4:14    |                                                       TIMER
  |----] [----------------------------------------------------------   T4:14
  |    DN                                                             (RES)----

T4:14
               -RES-   2:91
               -RTO-   2:92

T4:14/DN
               -] [-   2:91
               -]/[-   2:90
```

```
NEW                                                      March 17, 1995    Page 55
Program Listing             Processor File: 1234.ACH                       Rung 2:92

Rung 2:92
|      RST AFTER                                          DEBOUNCE
|      E-STOP                                             TIMER
|    B3          B3                                      +RTO---------------+
|--] [-------] [-----------------------------------------+RETENTIVE TIMER ON+-(EN)-
|    30          21                                      |Timer       T4:14+-(DN)
|                                                        |Time Base     1.0|
|                                                        |Preset          9|
|                                                        |Accum           0|
|                                                        +-----------------+

B3/21
            -] [-   2:0 2:12 2:23 2:30 2:31 2:37 2:50 2:62 2:92
            -( )-   2:12

B3/30
            -] [-   2:90 2:92
            -( )-   2:90

T4:14
            -RES-   2:91
            -RTO-   2:92

Rung 2:93
|      DEBOUNCE       MCR
|      TIMER
|       T4:14        I:1.0                                                    O:3.0
|-+----] [------+----] [-----------------------------------------------------( )--
| |     TT     |     13                                                        10
| | I:2.0      |
| +--] [-------+
|     2

I:1.0/13
            -] [-   2:12 2:16 2:19 2:22 2:26 2:27 2:37 2:39 2:40 2:93

I:2.0/2
            -] [-   2:93

O:3.0/10
            -( )-   2:93

T4:14/TT
            -] [-   2:93

Rung 2:94
|       1                                                                       B3
|--[LBL]-----------------------------------------------------------------------( )--
|                                                                              152

71
```

```
NEW                                                   March 17, 1995  Page 56
Program Listing        Processor File: 1234.ACH                      Rung 2:95
2:LBL1
            -JMP-  2:21
            -LBL-  2:94

B3/152
            -( )-  2:94

Rung 2:95
 |----------------------------------+END+----------------------------------|
```

```
NEW                                               March 17, 1995    Page 57
Program Listing         Processor File: 1234.ACH                    Rung 3:0

Rung 3:0
                                                           inv up
  +SBR---------------+   B3                                O:3.0
 -+SUBROUTINE        +--]/[--------------------------------+----( )-----+-
  +------------------+  156                                |     0      |
                                                           |   brake    |
                                                           |   O:3.0    |
                                                           +----( )-----+
                                                                12

B3/156
              -] [-  2:18
              -]/[-  2:16  3:0
              -( )-  2:15

O:3.0/0
              -] [-  2:30  2:36
              -]/[-  3:1
              -( )-  2:37  3:0

O:3.0/12
              -( )-  2:30  3:0

Rung 3:1
         head over                                         TI2 rotate
           skid                                             to skid
     O:3.0    I:1.0                                          O:3.0
  --]/[-----]/[----------------------------------------------( )-----|
     0        4                                                7

I:1.0/4
              -] [-  2:18  2:25  2:26  2:32  2:34  2:41  2:86
              -]/[-  2:16  2:61  3:1

O:3.0/0
              -] [-  2:30  2:36
              -]/[-  3:1
              -( )-  2:37  3:0

O:3.0/7
              -]/[-  2:17
              -( )-  2:62  3:1

Rung 3:2
                                                      +RET-------------+
  ----------------------------------------------------+RETURN         +-
                                                      +---------------+
```

```
NEW                                                    March 17, 1995    Page 58
Program Listing          Processor File: 1234.ACH                        Rung 3:3
Rung 3:3
|---------------------------------+END+---------------------------------|
```

```
NEW                                                          March 17, 1995   Page 59
Program Listing          Processor File: 1234.ACH                             Summary

REPORT OPTIONS SUMMARY

Insure Valid X-Ref Info:            YES
        Graphics Mode:                      NO
        Page Width:                         80
        Page Length:                        60

Starting File:                      2
        Ending File:                        3
        Power Rail:                         YES
        Address Commants:                   YES
        Address Display:                    YES
        Rung Comments:                      YES
        Ladder Cross Reference:             ALL
```

What is claimed is:

1. An apparatus for use in controlling a force to be applied through a vacuum cup, comprising:
   a valve body defining an inner chamber, the valve body further defining first second, and third airflow passageways, wherein the first airflow passageway includes a lift vacuum passage extending through the valve body to the chamber, the second airflow passageway include, a pilot vacuum passage extending through the valve body to the chamber, and the third airflow passageway includes a vacuum cup passage extending through the valve body to the chamber;
   a vacuum cup connected to the valve body in airflow communication with the vacuum cup passage; and
   a piston disposed in the chamber and positioned for reciprocal movement between a first position and a second position, wherein the piston in the first position provides airflow communication between the pilot vacuum passage and the vacuum cup passage and further restricts airflow communication between the lift vacuum passage and the vacuum cup passage, and wherein the piston in the second position provides airflow communication between the lift vacuum passage and the vacuum cup passage and further restricts airflow communication between the pilot vacuum passage and the vacuum cup passage.

2. The apparatus of claim 1, further comprising:
   a bar connected to the valve body;
   a base;
   a vertical support having a first end connected to the bar and a second end connected to the base, the bar being movably connected to the vertical support for vertical movement; and
   a first drive mechanism for moving the bar along the vertical support.

3. The apparatus of claim 2, further comprising:
   a frame connecting the bar to the vertical support; and
   a plurality of valve bodies, each of the valve bodies having first, second and third airflow passageways, including a lift vacuum passage, a pilot vacuum passage, and a vacuum cup passage, respectively, and corresponding reciprocally movable pistons and vacuum cups, connected to the bar.

4. The apparatus of claim 3 wherein the frame defines an aperture and the bar is slidably connected to the frame, and further comprising a sensor and corresponding detector connected to the bar and positioned so that the sensor transmits a beam through the aperture when the bar is a particular position.

5. The apparatus of claim 4, further comprising:
   a second drive mechanism for rotating the frame about the vertical support; and
   programmed logic, coupled to the sensor, the programmed logic being configured to:
   receive an input signal from the sensor indicating that the beam is interrupted;
   generate a first output signal for use in controlling the first drive mechanism to lower the frame until the programmed logic receives the input signal from the sensor;
   generate a second output signal for use in providing a first vacuum force through the pilot vacuum passage and subsequently providing a second vacuum force through the vacuum lift passage; and
   generate a third output signal for use in controlling the first drive mechanism to raise the frame and controlling the second drive mechanism to rotate the frame.

6. The apparatus of claim 5 wherein the programmed logic is further configured to generate a fourth output signal for use in providing a positive pressure through the pilot vacuum passage.

7. The apparatus of the claim 6 wherein the programmed logic is further configured to generate a third output signal for use in providing a positive pressure through the pilot vacuum passage.

8. The apparatus of claim 2, further comprising a second drive mechanism for rotating the bar about the vertical support.

9. The apparatus of claim 2, further comprising programmed logic for controlling operation of the piston, the programmed logic being configured to: generate a first output signal for use in providing a first vacuum force through the pilot vacuum passage, and generate a second output signal for use in providing a second vacuum force through the vacuum lift passage.

10. The apparatus of claim 3, further comprising a source of vacuum including a pilot vacuum source and a lift vacuum source, the pilot vacuum source being at a smaller negative pressure in magnitude than the lift vacuum source, the pilot vacuum source in airflow communication with the pilot vacuum passage of each valve body, the lift vacuum passage in airflow communication with the lift vacuum passage of each valve body, whereby the pilot vacuum source moves the pistons associated with obstructed vacuum cups from the first positions to the second positions such that the lift vacuum source is only in airflow communication with obstructed vacuum cups.

11. The apparatus of claim 1, further comprising a restrictor tube connecting the pilot vacuum passage with the chamber, the restrictor tube limiting movement of the piston in the second position.

12. The apparatus of claim 11 wherein the piston includes a chamber sized to receive an end of the restrictor tube.

13. The apparatus of claim 1, further comprising first and second seals positioned between the piston and a wall of the chamber.

14. The apparatus of claim 13 wherein the first and second piston seals have different outside diameters.

15. The apparatus of claim 1, further comprising a tube located within the vacuum cup passage for connecting the vacuum cup to the valve body.

16. The apparatus of claim 15, further comprising a check valve in the vacuum cup passage.

17. The apparatus of claim 1 wherein the valve body comprises a main body and a valve cap.

18. The apparatus of claim 17 wherein the valve cap limits movement of the piston in the first position.

19. The apparatus of claim 1 wherein the vacuum cup includes an accordion-shaped periphery.

20. A method for detecting whether an object obstructs a vacuum cup and for applying a vacuum force through the vacuum cup if obstructed, comprising the steps of:
   applying a first vacuum force from a pilot vacuum passage through a valve body having a piston in a first position, wherein the piston in the first position provides an airflow passage way between the pilot vacuum passage and a vacuum cup passage through the valve body and further restricts an airflow passageway between a lift vacuum passage through the valve body and the vacuum cup passage;
   moving the piston to a second position with the first vacuum force if a vacuum cup connected to the vacuum cup passage of the valve body is obstructed, wherein the piston in the second position provides an airflow passageway between the lift vacuum passage and the vacuum cup passage and further restricts an airflow passageway between the pilot vacuum passage and the vacuum cup passage; and applying a second vacuum force from the lift vacuum passage through the vacuum cup with the piston in the second position.

21. The method of claim 20, further comprising the step of applying a burst of air to the piston in order to move the piston back from the second position to the first position.

22. The method of claim 20, wherein the first vacuum force is generated by a first negative air pressure and the second vacuum force is generated by a second negative air pressure, wherein the first negative air pressure is a smaller negative pressure in magnitude than the second negative air pressure.

23. The method of claim 20, wherein a plurality of pistons are provided, and the first vacuum force moves only selected pistons to connect only those vacuum cup passages associated with vacuum cups that are obstructed by an object to the lift vacuum passages for application of the second vacuum force.

24. A vacuum lifting apparatus for lifting one or more objects comprising:

a frame including a plurality of vacuum cups;

a source of lift vacuum separately connectable to each vacuum cup;

a movable valve for each vacuum cup which controls connection of each vacuum cup with the source of lift vacuum, each valve presettable so as to close the connection between the lift vacuum source and the respective vacuum cup;

a source of pilot vacuum separate from the source of lift vacuum, the source of pilot vacuum connectable by each valve to each respective vacuum cup, the valve in the preset position providing an open connection between the pilot vacuum source and the vacuum cup, wherein the source of pilot vacuum applied to each valve and vacuum cup causes movement of the valve of each vacuum cup which is obstructed by one of the objects to be lifted, wherein the moved valve opens the previously closed connection of the vacuum cup with the source of lift vacuum, and also closes the previously open connection of the vacuum cup with the source of pilot vacuum; and a lift mechanism for lifting the frame vertically up and down.

25. A method for detecting whether an object obstructs a vacuum cup and for applying a vacuum force through the vacuum cup if obstructed, comprising the steps of:

applying a first vacuum force generated by a first negative air pressure through a valve body having a piston in a first position;

moving the piston to a second position with the first vacuum force if a vacuum cup connected to the valve body is obstructed; and applying a second vacuum force generated by a second negative air pressure to the vacuum cup, wherein the first negative air pressure is a smaller negative pressure in magnitude than the second negative air pressure through the vacuum cup with the piston in the second position.

26. The method of claim 25, wherein a plurality of pistons are provided, and the first vacuum force moves only selected pistons such that only those vacuum cups that are obstructed receive the second vacuum force.

* * * * *

UNITED STATES PATENT AND TRADEMARK OFFICE
CERTIFICATE OF CORRECTION

PATENT NO. : 5,755,550

DATED : May 26, 1998

INVENTOR(S) : Brandt et al.

It is certified that error appears in the above-identified patent and that said Letters Patent is hereby corrected as shown below:

In column 2, line 59, "12" should read —16—. (2nd occurrence)

In column 3, line 16, "airflows" should read —airflow—.

In column 5, line 48, delete "10" after the word "the".

In column 5, line 50, "other" should read —. Other—.

In column 6, line 25, "L" should read —1—.

In column 131, line 8, "include" should read —includes—.

In claim 24, column 134, line 3, "clap" should read —cup—.

Signed and Sealed this

Twenty-seventh Day of April, 1999

Attest:

Q. TODD DICKINSON

*Attesting Officer*     *Acting Commissioner of Patents and Trademarks*